(12) United States Patent
Oka et al.

(10) Patent No.: US 7,436,762 B2
(45) Date of Patent: Oct. 14, 2008

(54) MOBILE COMMUNICATION NETWORK SYSTEM FOR MANAGING THE LOCATION OF A MOBILE IP TERMINAL

(75) Inventors: Kazuyuki Oka, Yokohama (JP); Keiichi Nakatsugawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 785 days.

(21) Appl. No.: 10/649,918

(22) Filed: Aug. 27, 2003

(65) Prior Publication Data

US 2004/0049532 A1    Mar. 11, 2004

(30) Foreign Application Priority Data

Aug. 29, 2002    (JP)    ............... 2002-251312

(51) Int. Cl.
   *H04L 12/26*    (2006.01)
(52) U.S. Cl. ...................... 370/218; 370/338
(58) Field of Classification Search ................ 370/338, 370/328, 310, 217, 218; 709/212, 215
   See application file for complete search history.

(56) References Cited

U.S. PATENT DOCUMENTS

| | | | | |
|---|---|---|---|---|
| 5,159,546 A * | 10/1992 | Inoue et al. | ................ | 700/17 |
| 5,612,957 A * | 3/1997 | Gregerson et al. | ........... | 370/401 |
| 6,795,857 B1 * | 9/2004 | Leung et al. | ................ | 709/224 |
| 7,145,898 B1 * | 12/2006 | Elliott | ................ | 370/352 |
| 7,257,091 B2 * | 8/2007 | Elko et al. | ................ | 370/276 |
| 2001/0046223 A1 * | 11/2001 | Malki et al. | ................ | 370/338 |
| 2003/0053453 A1 * | 3/2003 | Ono et al. | ................ | 370/389 |
| 2003/0065971 A1 * | 4/2003 | Allen et al. | ................ | 714/4 |
| 2003/0179742 A1 * | 9/2003 | Ogier et al. | ................ | 370/351 |
| 2007/0147392 A1 * | 6/2007 | Oka | ................ | 370/395.52 |

FOREIGN PATENT DOCUMENTS

| | | |
|---|---|---|
| JP | 9-101920 | 4/1997 |
| JP | 10-013494 | 1/2000 |
| JP | 2000-101624 | 4/2000 |
| JP | 2000-183974 | 6/2000 |
| JP | 2002-515712 | 5/2002 |

OTHER PUBLICATIONS

C. Perkins. IP Mobility Support for IPv4. Nokia Research Center. Jan. 2002 pp. 1-98.
B. Curtain. Internationalization of the File Transfer Protocol. Defense Information Systems Agency. Jul. 1999. pp. 1-27.

(Continued)

*Primary Examiner*—Melvin Marcelo
(74) *Attorney, Agent, or Firm*—Katten Muchin Rosenman LLP

(57) ABSTRACT

When a failure occurs in a node managing the location information of mobile node MN, it is possible to resume packet transfer from correspondent node CN to mobile node MN after the node is restored from the failure, in a mobile communication network. The mobile communication network includes a plurality of nodes including a home agent, a correspondent node, and a mobility anchor point connected to the network, wherein each node produces a duplication of a binding cache on receipt of location registration information from a mobile terminal, maintains and manages the duplication of the binding cache, and on restoration of the node from a failure, each node obtains the contents of the binding cache stored before the node failure from the duplicated binding cache.

6 Claims, 26 Drawing Sheets

OTHER PUBLICATIONS

D. B. Johnson et al., Mobility Support in IPv6. Jun. 1, 2002, pp. 1-157.

H. Soliman et al. Hierarchical MIPv6 Mobility Management. Jul. 2002, pp. 1-34.

* cited by examiner

MOBILE COMMUNICATION NETWORK SYSTEM FOR MANAGING THE LOCATION OF A MOBILE IP TERMINAL

FIELD OF THE INVENTION

The present invention relates to a mobile communication network system employing Mobile Internet Protocol (Mobile-IP), having capability of managing the location of a mobile terminal and recovering the location information.

BACKGROUND OF THE INVENTION

In an IP network for communication using Internet Protocol, and further in a mobile communication network using Mobile-IP (MIP. Refer to HYPERLINK http://www.ietf.org/rfc/rfc3220.txt), a mobile terminal (hereinafter referred to as mobile node MN) consisting of a portable personal computer, a portable telephone terminal, or the like is connected to the Internet through a home agent HA functioning as a node. In such a network, mobile node MN informs the corresponding home agent HA about the location information of each mobile node MN, so that the location of each mobile node is registered in each home agent HA.

The location information received from mobile node MN is maintained and managed in each home agent HA as binding cache BC. Home agent HA transfers a packet, which is originated in correspondent node CN and destined for mobile node MN, in accordance with the contents of binding cache BC.

When the location of mobile node MN is registered into correspondent node CN for optimizing the route, correspondent node CN transmits a packet for transfer directly to mobile node MN of interest according to binding cache BC.

The above-mentioned procedure is also applicable in the case of Mobile-IPv6 (MIPv6. For example, refer to http://www.ietf.org/internet-drafts/draft-ietf-mobileip-iPv6-18.txt).

Mobile-IPv6 is a kind of Mobile-IP which is based on Internet Protocol version 6.

Further, the above-mentioned procedure is also applicable to Hierarchical Mobile-IP (HMIP. For example, refer to http://www.ietf.org/internet-drafts/draft-ietf-mobileip-hmiPv6 -06.txt) and its IPv6 version, Hierarchical Mobile-IPv6 (HMIPv6. For example, refer to http://www.ietf.org/rfc/rfc2460.txt). These protocols enable to support high-speed handover by a Mobility Anchor Point (MAP), which is implemented in the network to which the mobile node moves, and acts as a proxy node in place of home agent HA.

The following links respectively refer to aforementioned nonpatent documents:

In such a mobile communication network, home agent HA acting as a node, correspondent node CN and mobility anchor point MAP maintain and manage the location information reported from mobile node MN as binding cache BC, thus enabling packet transfer from correspondent node CN to mobile node MN.

Under such circumstances, when a failure occurs in either node which retains binding cache BC registered from mobile node MN, transferring a packet originated in correspondent node CN and destined for mobile node MN is suspended even when the node of interest is restored from the failure, unless binding cache BC having been retained is restored.

Generally, when a failure occurs in a node retaining binding cache BC, the restoration of binding cache BC relies on a request for location re-registration which is to be issued at an arbitrary timing from mobile node MN. In such a case, a packet originated in correspondent node CN and destined for mobile node MN possibly fails to reach the destination, or reaches through an unintended route (in other words, through a route which is not optimized).

SUMMARY OF THE INVENTION

Accordingly, it is an object of the present invention to provide a mobile communication network, so as to solve such inconvenience explained above.

In a mobile communication network according to the present invention to solve the aforementioned problem, each node connected to the network, including home agent HA, correspondent node CN, and mobility anchor point MAP, produces a duplication of binding cache (i.e. binding cache for the backup), and maintains and manages the duplicated binding cache.

On restoration from a failure having occurred in either of the nodes, each node of home agent HA, correspondent node CN, and mobility anchor point MAP searches the aforementioned backup binding cache and obtains binding cache BC having been retained before the failure.

Further, in order to verify whether the obtained binding cache BC is valid, each node of interest requests mobile node MN, of which location has been registered beforehand, to perform location registration again. In reply to this request, when the node receives a response of location registration information from mobile node MN, the node determines that the binding cache BC of interest is still valid. The node therefore maintains and manages the location information of mobile node MN in binding cache BC.

Meanwhile, when the node receives no reply of location registration information from mobile node MN, the node determines the binding cache BC of interest is not valid, and therefore the node deletes binding cache BC.

Further, when any of home agent HA, correspondent node CN or mobility anchor point MAP requests mobile node MN to register the location so as to verify the validity of binding cache BC, and in case that a plurality of mobile nodes have been registered in the backup bending cache, the location registration request messages to be forwarded to the plurality of mobile nodes are controlled to transmit one after another with delayed transmission intervals, so as to lessen the load.

Further scopes and features of the present invention will become more apparent by the following description of the embodiments with the accompanied drawings.

DETAILED DESCRIPTION OF THE PREFERRED EMBODIMENTS

The preferred embodiments of the present invention will be described hereinafter referring to the charts and drawings. However, prior to the description of the embodiment, problems in the conventional mobile communication network, which lie as the prerequisites against the issues of the present invention, are studied further for easy understanding of the present invention.

Figure 1:
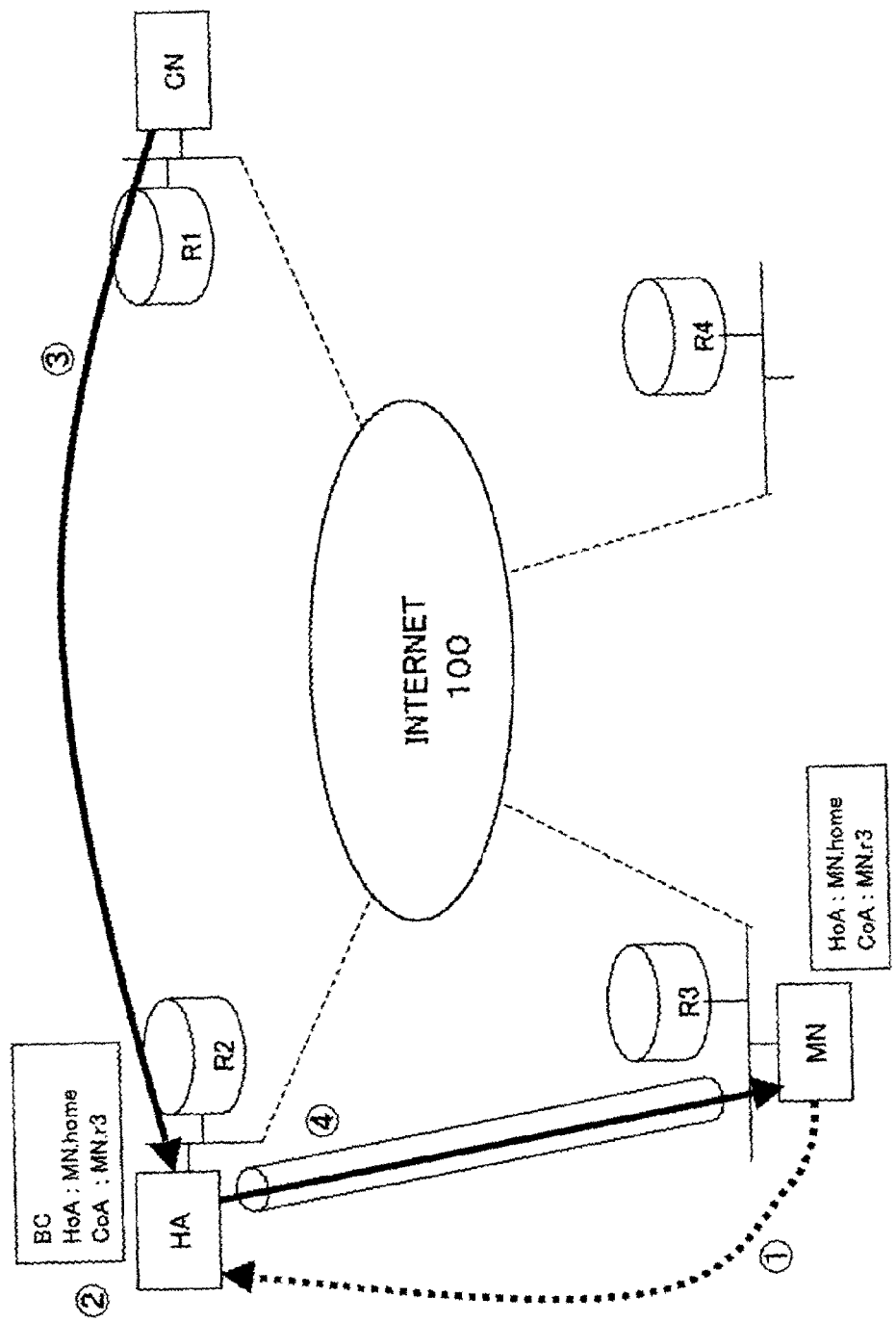
FIG. 1 shows exemplary routes of location registration and packet transfer after the location registration in conformity with Mobile-IPv6.

FIG. 1 shows exemplary routes for use in location registration and packet transfer after location registration in conformity with Mobile-IPv6. In this figure, R1-R4 respectively denote routers. Each router belongs to each of the networks which are interconnected through the Internet 100.

In FIG. 1, a mobile node MN has moved to a network area having router R3 from a home network location in which a home agent HA manages the registration location in a network area having router R2. In this situation, mobile node MN obtains a care-of address (CoA) through an external link by the use of a 'Router Advertisement' message which is periodically issued from router R3 located in the network area to which mobile node MN moved.

Thereafter mobile node MN transmits the location registration information to home agent HA (step ①).

On receipt of the location registration information from mobile node MN, home agent HA manages the location information as binding cache BC (step ②). Here, both the home address (HoA) of mobile node MN and the care-of address (CoA) of mobile node MN are included in the location registration information sent from mobile node MN.

Meanwhile, correspondent node CN transmits packets destined for mobile node MN to the home address (HoA) of mobile node MN when correspondent node CN has not recognized that mobile node MN already moved (step ③).

Home agent HA handles the packet received from correspondent node CN as a packet to be destined for mobile node MN of which information is retained in binding cache BC. Accordingly, home agent HA transfers the packet to the care-of address (CoA) according to binding cache BC after encapsulating the packet of interest (step ④).

In such a way, even when mobile node MN has moved from the home address (HoA) to the care-of address (CoA), mobile node MN can receive the packet destined therefor transmitted from correspondent node CN which does not recognize mobile node MN has moved.

Figure 2:
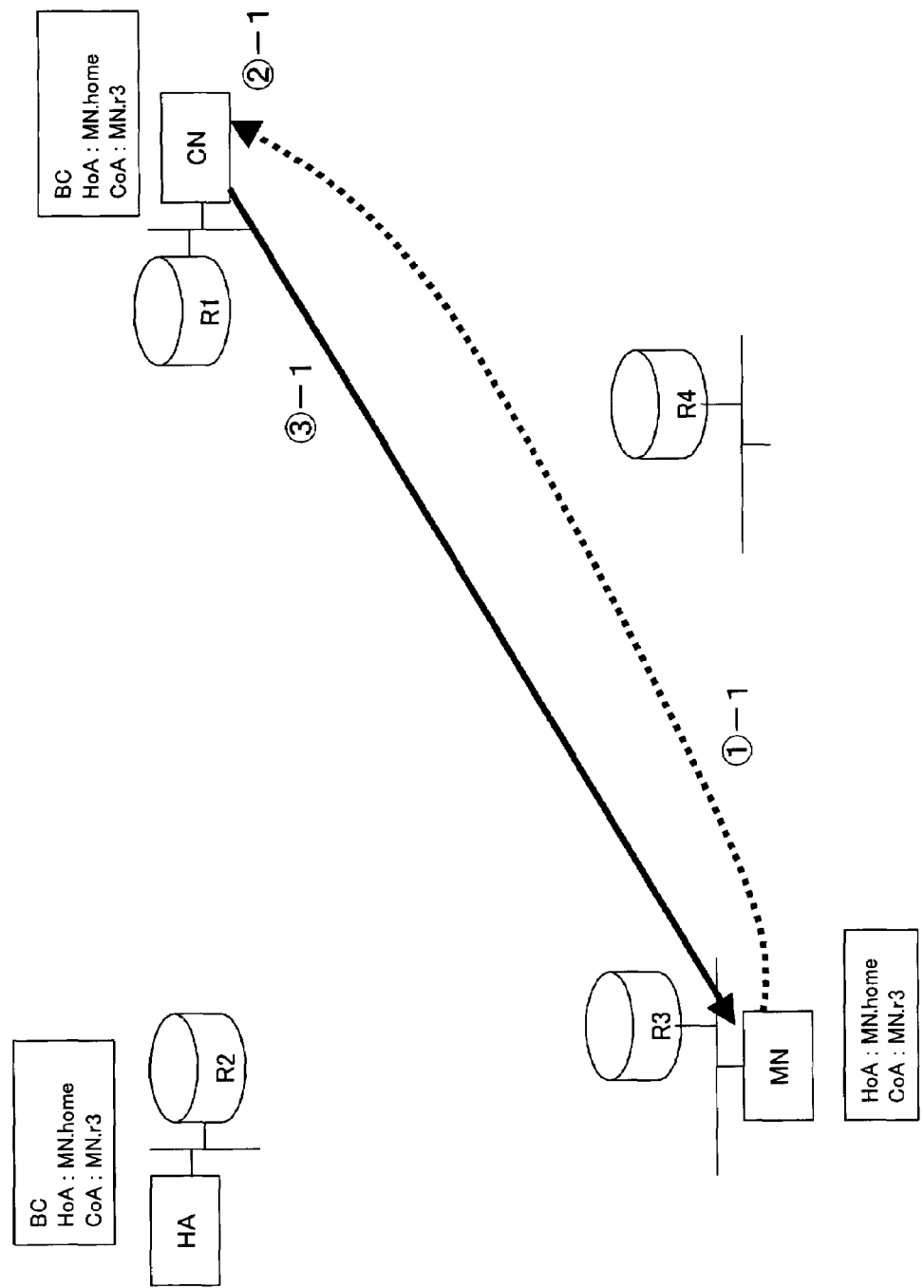
FIG. 2 shows exemplary routes of location registration and packet transfer after the location registration as a result of route optimization in conformity with Mobile-IPv6.

FIG. 2 shows exemplary routes for use in location registration and packet transfer after location registration as a result of route optimization in conformity with Mobile-IPv6. In this figure, as well as the succeeding figures, the connection between each node and the Internet is omitted for simplification, as it is identical to FIG. 1.

In a similar manner to FIG. 1, when mobile node MN has moved from the location in the home network area having router R2, mobile node MN determines whether route optimization is to perform. When deciding to perform the route optimization, mobile node MN transmits the location registration information to correspondent node CN (step ①-1).

On receipt of the location registration information from mobile node MN, correspondent node CN manages the location information as binding cache BC (step ②-1) When correspondent node CN is to transmit a packet to mobile node MN, correspondent node CN transmits the packet of interest to the care-of address (CoA) according to binding cache BC (step ③-1). In this case shown in FIG. 2, it becomes possible to transmit a packet from correspondent node CN directly to mobile node MN, without interception by home agent HA. This enables to omit packet processing in home agent HA, which results in making the processing time shorter as well as achieving the route optimization.

Figure 3:
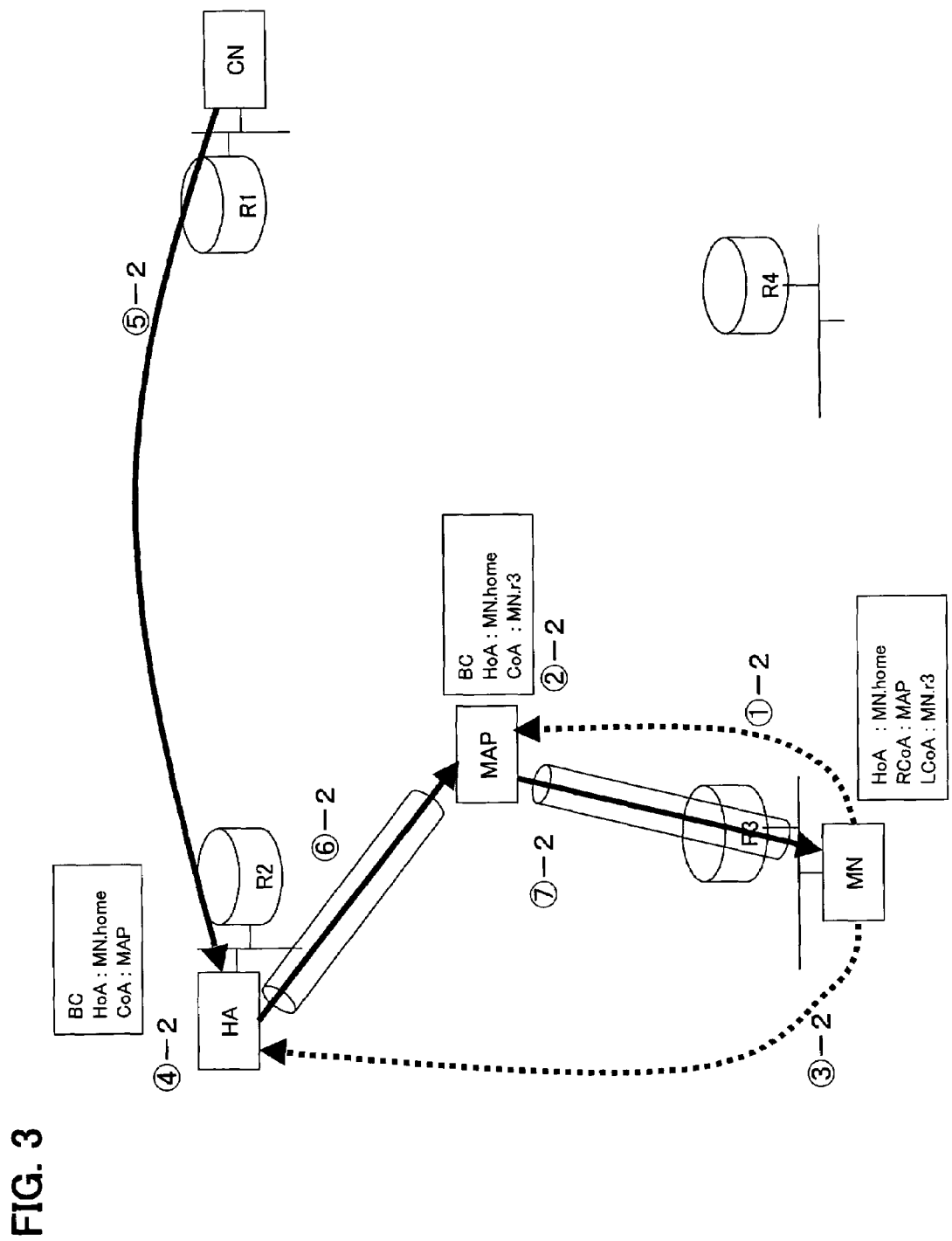
FIG. 3 shows exemplary routes of location registration and packet transfer after the location registration as a result of route optimization in conformity with Hierarchical Mobile-IPv6.

Further, FIG. 3 shows exemplary routes of location registration and packet transfer after the location registration in conformity with Hierarchical Mobile-IPv6.

In the case of Hierarchical Mobile-IPv6, when mobile node MN moves, mobile node MN obtains both an on-link care-of address (LCoA) and a regional care-of address (RCoA) through an external link. Mobile node MN then transmits to mobility anchor point MAP the location registration information by the use of the on-link care-of address (LCoA) as the location information (step ①-2).

On receipt of the location registration information from mobile node MN, mobility anchor point MAP manages the location information as binding cache BC (step ②-2).

After transmitting the location registration information to mobility anchor point MAP, mobile node MN also transmits location registration information to home agent HA (step ③-2). At this time, the regional care-of address (RCoA) is used as the location information.

On receipt of the location registration information from mobile node MN, home agent HA manages the location information as binding cache BC (step ④-2).

Here, when correspondent node CN has not recognized the movement of mobile node MN, correspondent node CN transmits a packet to the home address (HoA) of mobile node MN (step ⑤-2).

Home agent HA receives the packet as a packet destined for mobile node MN the information of which is retained in binding cache BC. After encapsulating the packet of interest, home agent HA transfers the encapsulated packet to the regional care-of address (RCoA) according to binding cache BC (step ⑥-2).

On receipt of the encapsulated packet destined for the regional care-of address (RCoA), mobility anchor point MAP decapsulates (removes the capsulation of) the received packet, and then recognizes the packet to be destined for mobile node MN the information of which is retained in binding cache BC. Further mobility anchor point MAP transfers the packet to the care-of address (CoA) according to binding cache BC after encapsulating the packet concerned (step ⑦-2).

Figure 4:
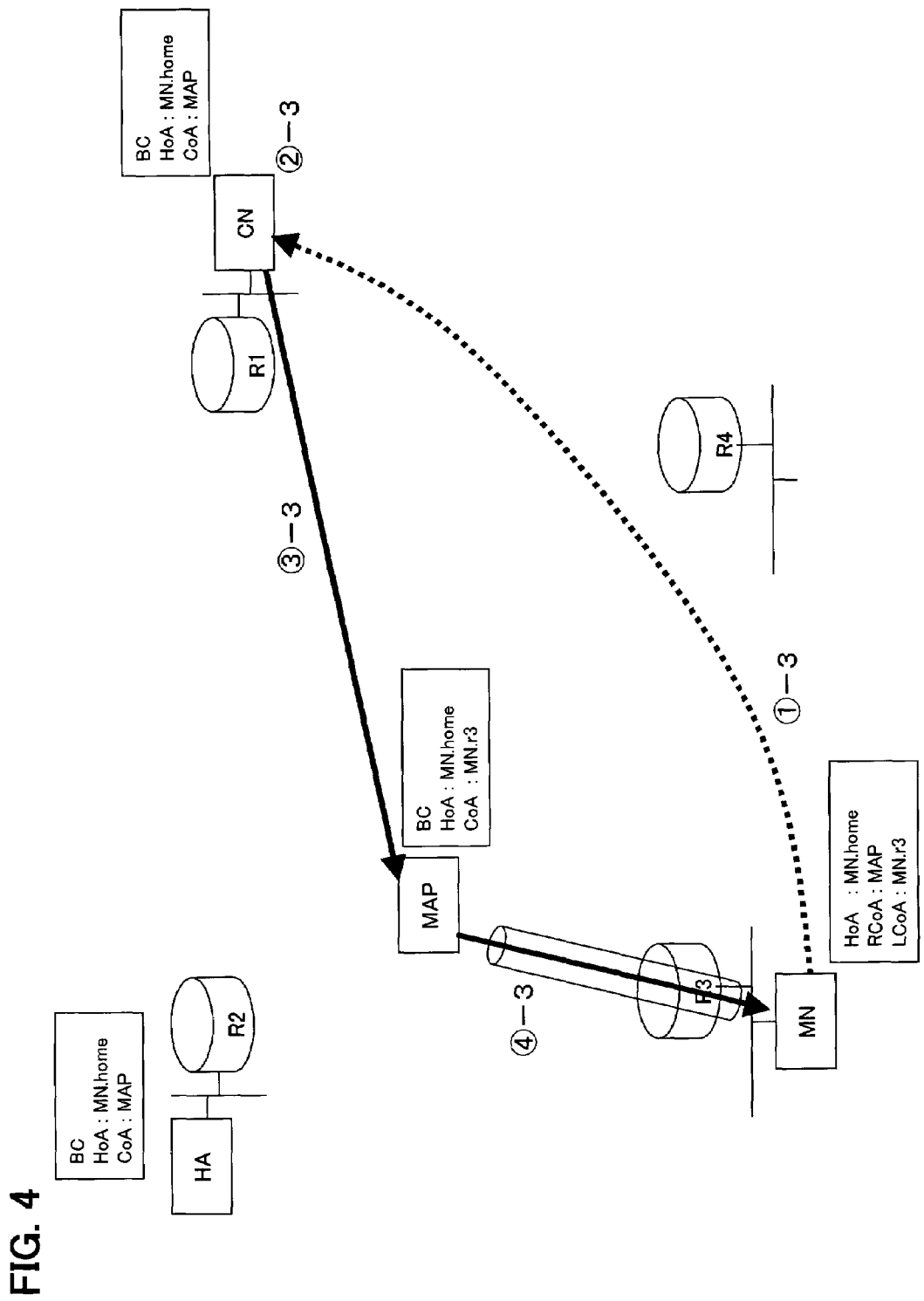
FIG. 4 shows exemplary routes of location registration and packet transfer after the location registration as a result of route optimization, in contrast to the location registration and packet transfer after the location registration conforming to Hierarchical Mobile-IPv6 shown in FIG. 3.

FIG. 4 shows exemplary routes of location registration and packet transfer after the location registration as a result of route optimization conforming to Hierarchical Mobile-IPv6, in contrast to the location registration and packet transfer after the location registration shown in FIG. 3.

Mobile node MN determines whether route optimization is to perform. When performing the route optimization, mobile node MN transmits the location registration information to correspondent node CN (step ①-3). At this time, the regional care-of address (RCoA) is used as the location information. On receipt of the location registration information from mobile node MN, correspondent node CN manages the location information as binding cache BC (step ②-3).

When transmitting a packet to mobile node MN, correspondent node CN transmits the packet to the care-of address (CoA) according to binding cache BC (step ③-3). Mobility anchor point MAP then receives the packet destined for the regional care-of address (RCoA), and recognizes the packet to be destined for mobile node MN the information of which is retained in binding cache BC. After encapsulating the packet, mobility anchor point MAP transfers the encapsulated packet to the care-of address (CoA) according to binding cache BC (step ④-3).

Figure 5:
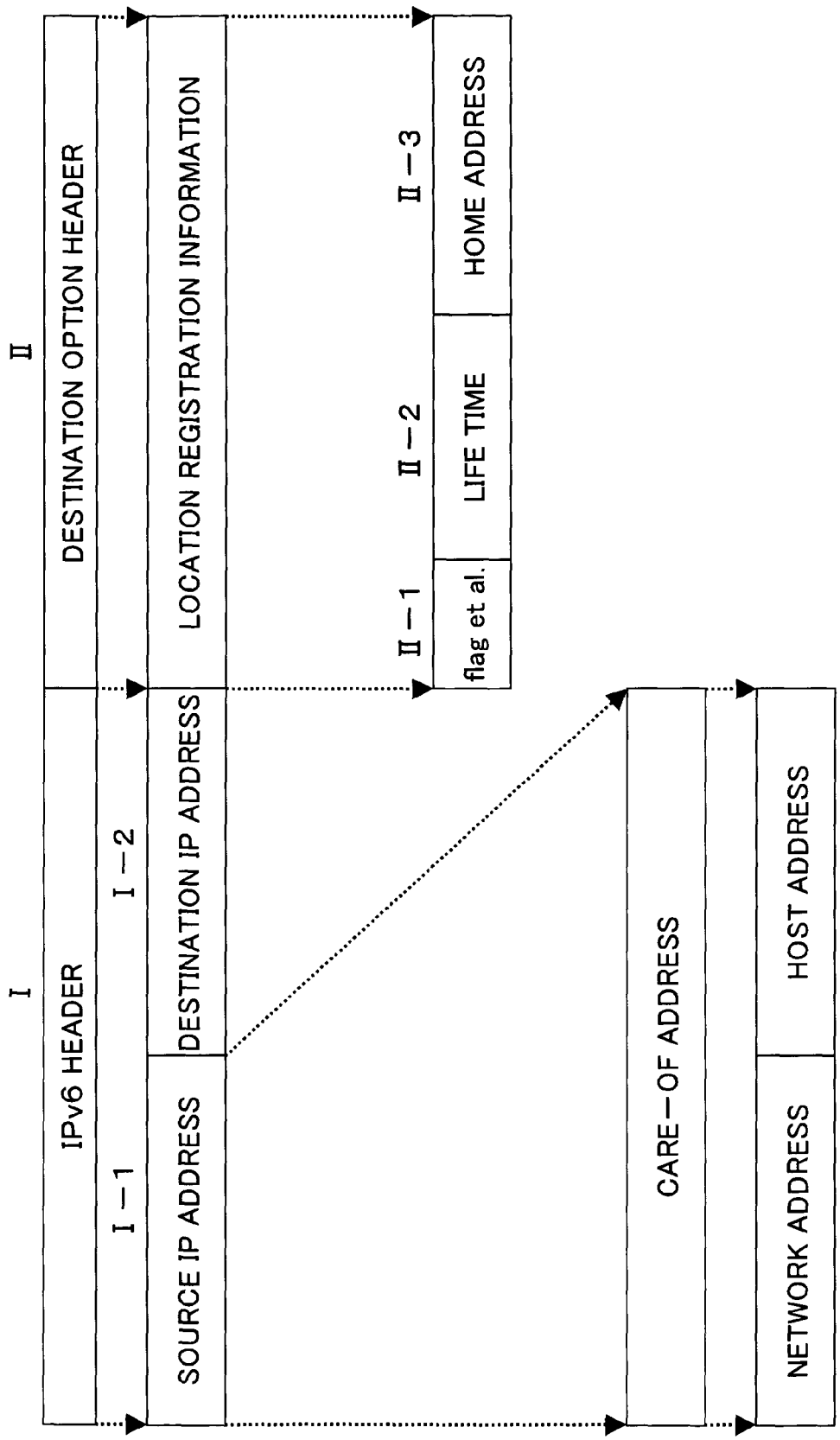
FIG. 5 shows an exemplary format of location registration information.

In relation to the above description, FIG. 5 shows an exemplary format of the aforementioned location registration information to be transmitted from mobile node MN to either home agent HA or correspondent node CN. The format shown in FIG. 5 is a format conforming to IPv6, in which only a header part is shown. The header part includes an IPv6 header I, and a destination option header II. IPv6 header I further is constituted of a source IP address (I-1) and a destination IP address (I-2).

As source IP address (I-1), there is specified the care-of address (CoA), which is the address on the link onto which mobile node MN moved, consisting of a network address and a host address. Destination IP address (I-2) is any one of the home address (HoA) of home agent HA, the address of correspondent node CN, or the address of mobility anchor point MAP, depending on the destination of the location registration information.

Destination option header II includes, as registration information, a flag II-1, a life time II-2 of binding cache BC, in other words, a retention period of the registration information, and a home address (HoA) II-3 which is the address of mobile node MN on the home link. This home address (HoA) is used as a key when searching backup binding cache BC.

Here, as shown in FIGS. 1 through 4, in Mobile IP (which includes Mobile-IPv6, Hierarchical Mobile-IP, and Hierarchical Mobile-IPv6), home agent HA, correspondent node CN and mobility anchor point MAP maintain and manage the location information sent from mobile node MN as binding cache BC, thus enabling packet transfer from correspondent node CN to mobile node MN.

In such situations as mentioned above, when a failure occurs in any node retaining binding cache BC registered from mobile node MN, and even after the node of interest is restored from the failure, it becomes unable to perform packet transfer from correspondent node CN to mobile node MN unless binding cache BC which was retained before is restored.

In general, the restoration timing of this binding cache BC relies on a request for location re-registration issued at an arbitrary timing from mobile node MN.

Figure 6:
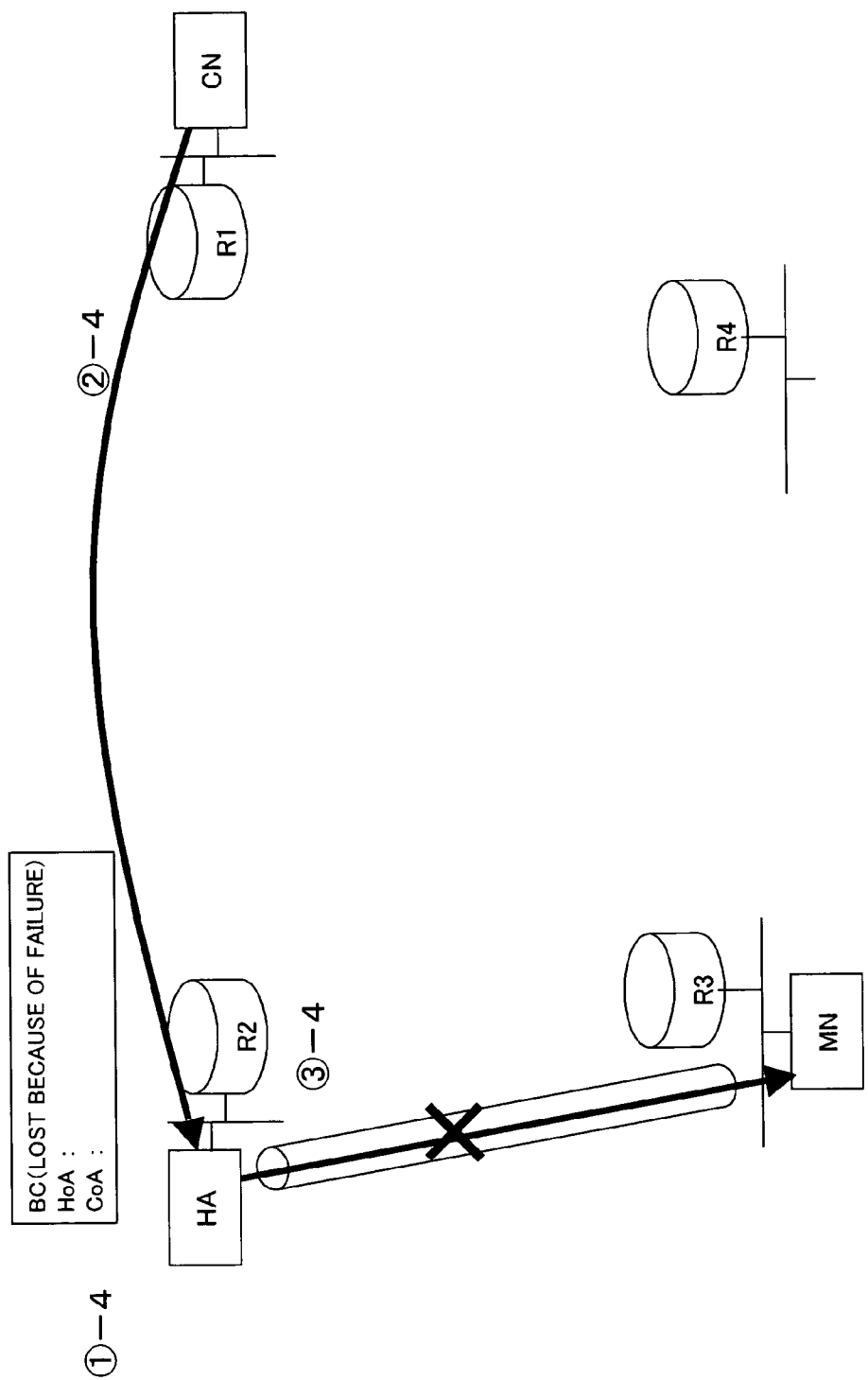
FIG. 6 shows a diagram illustrating an example of failure occurrence in home agent HA in the case of Mobile-IPv6.

FIG. 6 shows an exemplary case when a failure occurs in home agent HA in conformity with Mobile-IPv6.

On occurrence of the failure in home agent HA, binding cache BC having been maintained and managed is lost, and thereafter, home agent HA is restored from the failure (step ①-4). Correspondent node CN transmits a packet to the home address (HoA) of mobile node MN because correspondent node CN does not retain binding cache BC for route optimization (step ②-4).

Because binding cache BC has been lost in home agent HA, it is not possible for home agent HA to transfer the packet originated in correspondent node CN and destined for the home address (HoA) of mobile node MN to the location onto which mobile node MN has moved (step ③-4).

Figure 7:
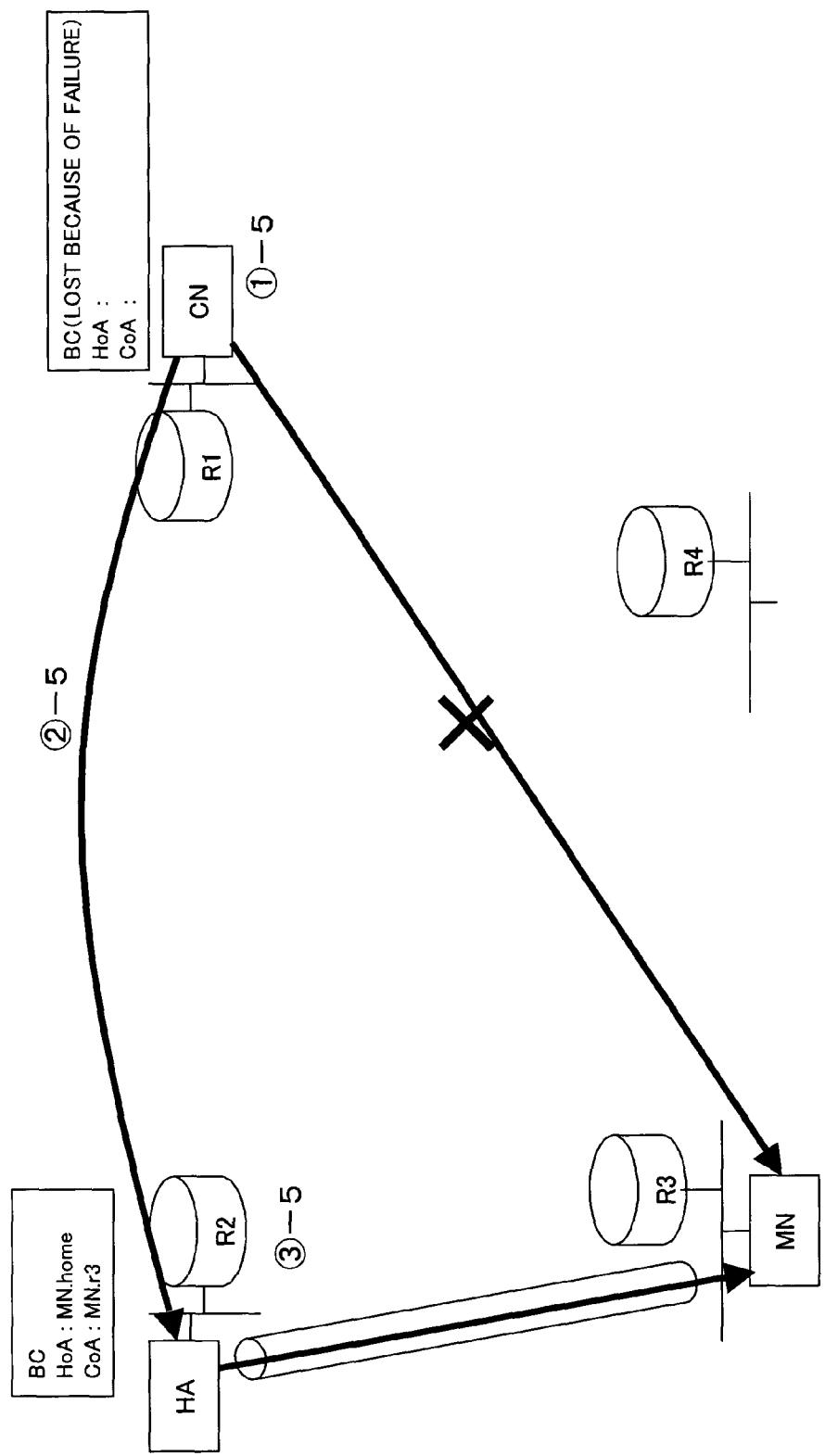
FIG. 7 shows a diagram illustrating an example of failure occurrence in correspondent node CN in the example while route optimization is being registered in the case of Mobile-IPv6 shown in FIG. 2.

FIG. 7 shows an exemplary case when a failure occurs in correspondent node CN while route optimization shown in FIG. 2 is being registered in conformity with Mobile-IPv6. On occurrence of the failure in correspondent node CN, binding cache BC having been maintained and managed is lost, and thereafter, correspondent node CN is restored from the failure (step ①-5).

Correspondent node CN transmits a packet to the home address (HoA) of mobile node MN, because correspondent node CN does not retain binding cache BC for route optimization (step ②-5). In FIG. 7, home agent HA transfers the packet to the care-of address (CoA) of mobile node MN (step ③-5). Accordingly, although the packet originated in correspondent node CN and destined for mobile node MN reaches mobile node MN, the intended route optimization does not take place.

Figure 8:
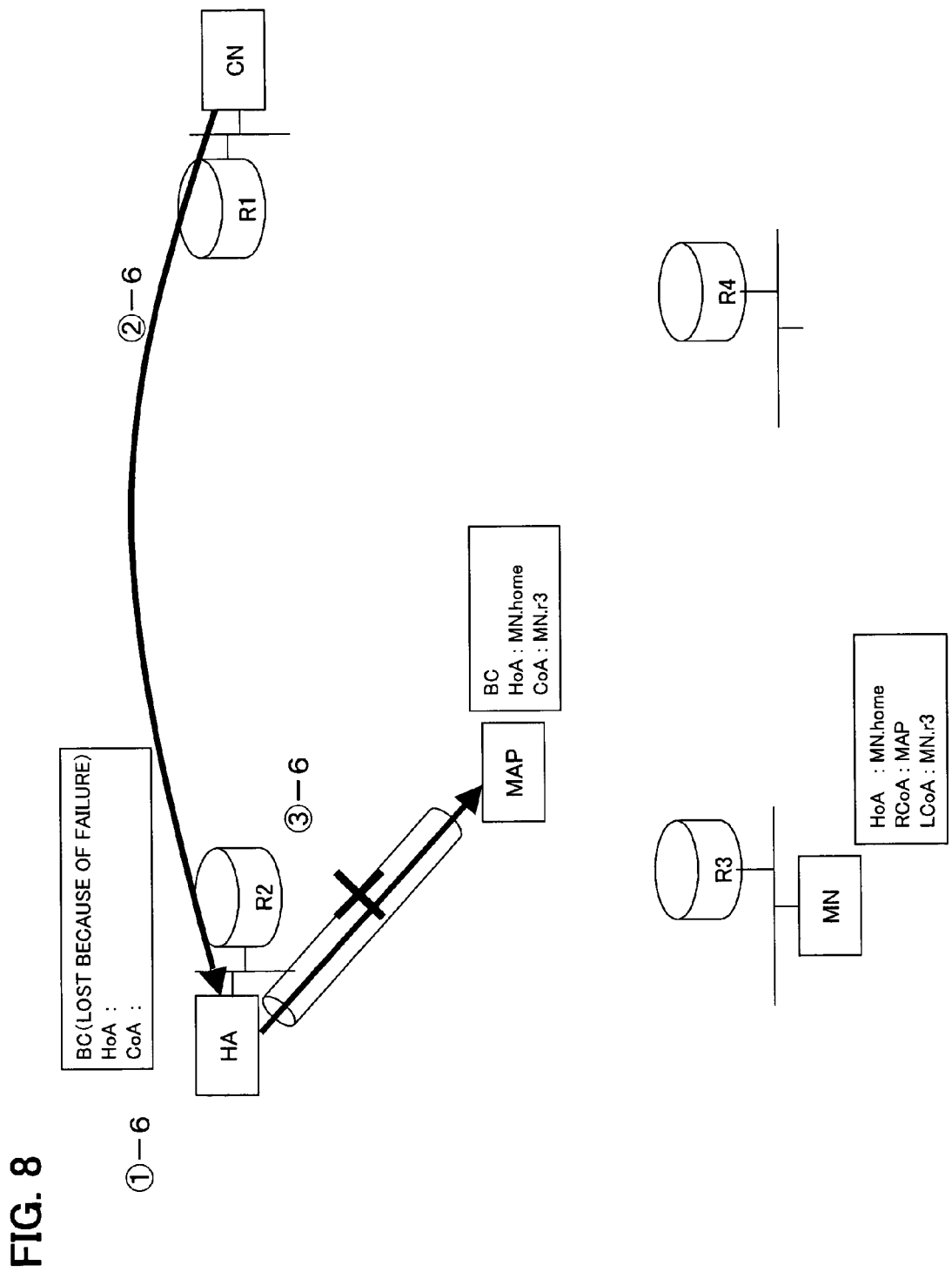
FIG. 8 shows a diagram illustrating an example of failure occurrence in home agent HA in the case of Hierarchical Mobile-IPv6 shown in FIG. 3.

FIG. 8 shows an exemplary case when a failure occurs in home agent HA in conformity with Hierarchical Mobile-IPv6 shown in FIG. 3. On occurrence of the failure in home agent HA, binding cache BC having been maintained and managed is lost, and thereafter, home agent HA is restored from the failure (step ①-6).

Correspondent node CN transmits a packet to the home address (HoA) of mobile node MN, because correspondent node CN does not retain binding cache BC for route optimization (step ②-6).

Because binding cache BC has been lost in home agent HA, it is not possible for home agent HA to transfer the packet originated in correspondent node CN and destined for the home address (HoA) of mobile node MN to the location to which mobile node MN has moved (step ③-6).

Figure 9:
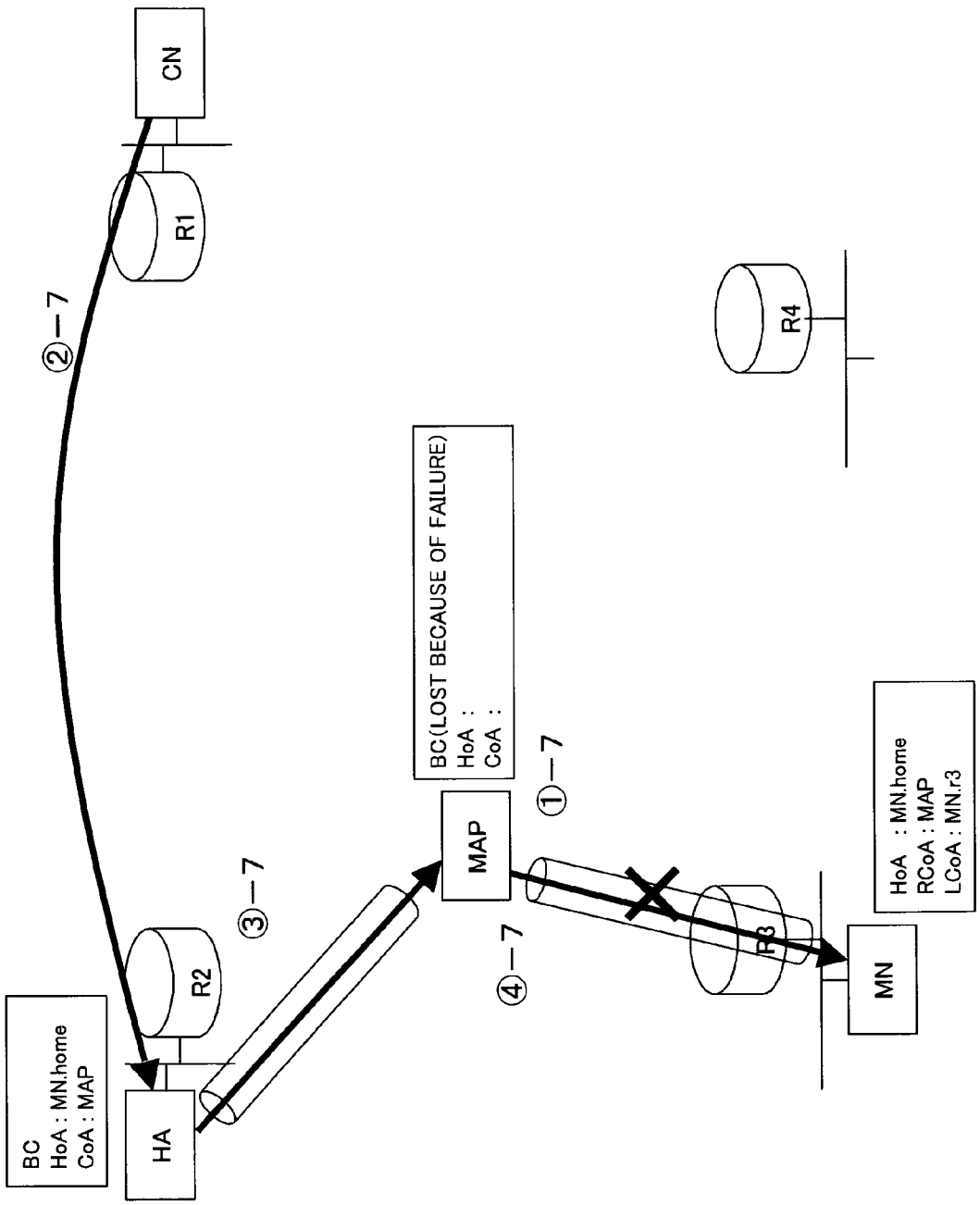
FIG. 9 shows a diagram illustrating an example of failure occurrence in mobility anchor point MAP in the case of Hierarchical Mobile-IPv6 shown in FIG. 3.

FIG. 9 shows an exemplary case when a failure occurs in mobility anchor point MAP in conformity with Hierarchical Mobile-IPv6 shown in FIG. 3. In this example, correspondent node CN does not retain binding cache BC for route optimization.

On occurrence of the failure in mobility anchor point MAP, binding cache BC having been maintained and managed is lost, and thereafter, mobility anchor point MAP is restored from the failure (step ①-7)

Correspondent node CN transmits a packet to the home address (HoA) of mobile node MN, because correspondent node CN does not retain binding cache BC for route optimization (step ②-7).

After encapsulating the received packet, home agent HA transfers the packet destined for the home address (HoA) of mobile node MN to the care-of address (CoA) in accordance with binding cache BC (step ③-7).

However, because binding cache BC has been lost in mobility anchor point MAP, it is not possible for mobility anchor point MAP to transfer the packet transmitted from home agent HA to the location to which mobile node MN has moved (step ④-7).

Figure 10:
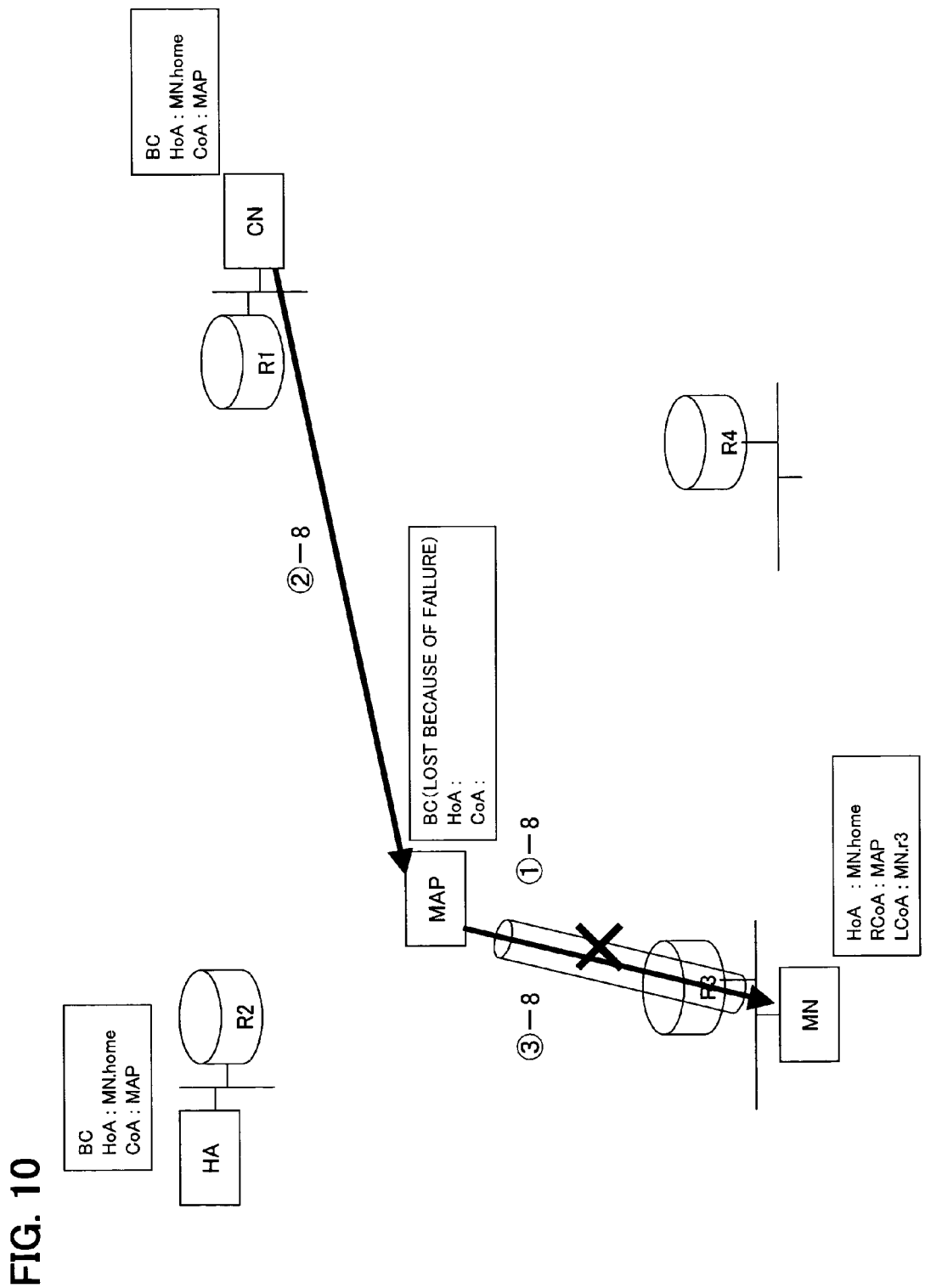
FIG. 10 shows a diagram illustrating an example of failure occurrence in mobility anchor point MAP while route optimization shown in FIG. 4 is performed, in the case of Hierarchical Mobile-IPv6.

FIG. 10 shows an exemplary case when a failure occurs in mobility anchor point MAP while route optimization shown in FIG. 4 is being performed in conformity with Hierarchical Mobile-IPv6. In this example, correspondent node CN retains binding cache BC for route optimization.

On occurrence of the failure in mobility anchor point MAP, binding cache BC having been maintained and managed is lost. Thereafter, mobility anchor point MAP is restored from the failure (step ①-8).

Correspondent node CN transmits a packet to the care-of address (CoA) of mobile node MN in accordance with binding cache BC, because correspondent node CN retains binding cache BC for route optimization (step ②-8).

Because binding cache BC has been lost in mobility anchor point MAP, it is not possible for mobility anchor point MAP to transfer the packet transmitted from correspondent node CN to the location to which mobile node MN has moved (step ③-8).

As having been illustrated in FIGS. 6 through 10, when a failure occurs in any node which retains binding cache BC, a packet originated in correspondent node CN and destined for mobile node MN does not reach the destination, or otherwise reaches through an unintended route (that is, a route without optimization).

In addition, restoration timing of binding cache BC depends on a request for location re-registration issued from mobile node MN at arbitrary timing.

In consideration of the above-mentioned inconvenience, according to the present invention, it is intended to eliminate such inconvenience when a failure occurs in any node. The embodiment of the present invention is described in the following.

Figure 11:
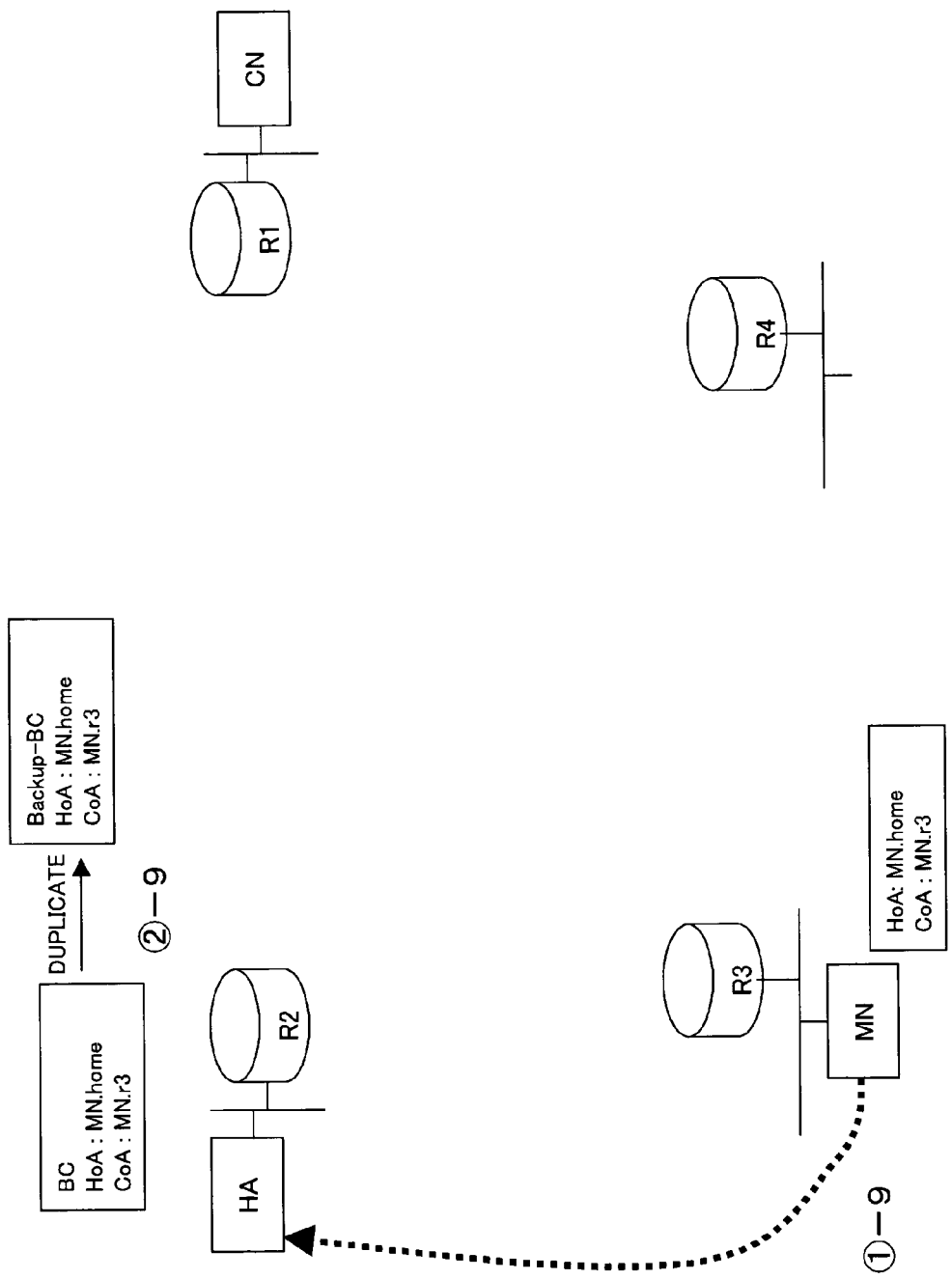
FIG. 11 shows an embodiment of the present invention.

FIG. 11 shows an embodiment of the present invention. One feature of the present invention is that home agent HA is provided with a procedure of duplicating binding cache BC from mobile node MN to a backup binding cache BC.

In FIG. 11, when mobile node MN moves, mobile node MN obtains the care-of address (CoA) from an external link by the use of a 'Router Advertisement' message which is periodically issued from router R3. Mobile node MN then transmits location registration information using the format shown in FIG. 5 (step ①-9).

Home agent HA, on receipt of the location registration information from mobile node MN, manages the location information as binding cache BC. At this time, home agent HA also duplicates binding cache BC for backup purpose (step ②-9).

Figure 12:
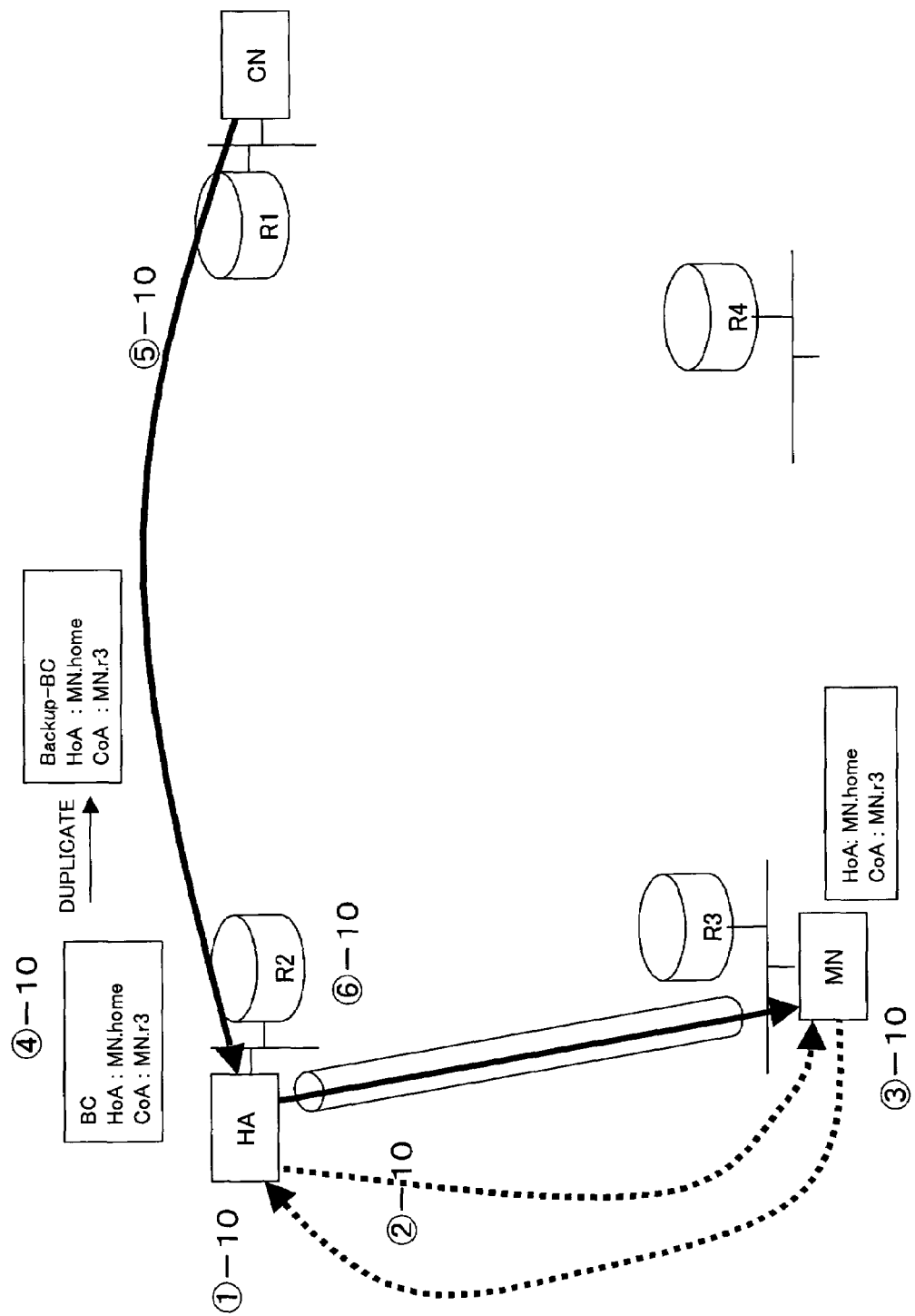
FIG. 12 shows a diagram illustrating that home agent HA, on restoration from a failure, starts maintenance and management of binding cache BC after identifying the validity of binding cache BC concerned.

FIG. 12 shows an exemplary case that a failure occurs in home agent HA, and that, on restoration from a failure, home agent HA starts maintenance and management processing of binding cache BC after identifying the validity of the binding cache BC. In this processing, the duplication of binding cache BC shown in FIG. 11 is used.

Figure 13:
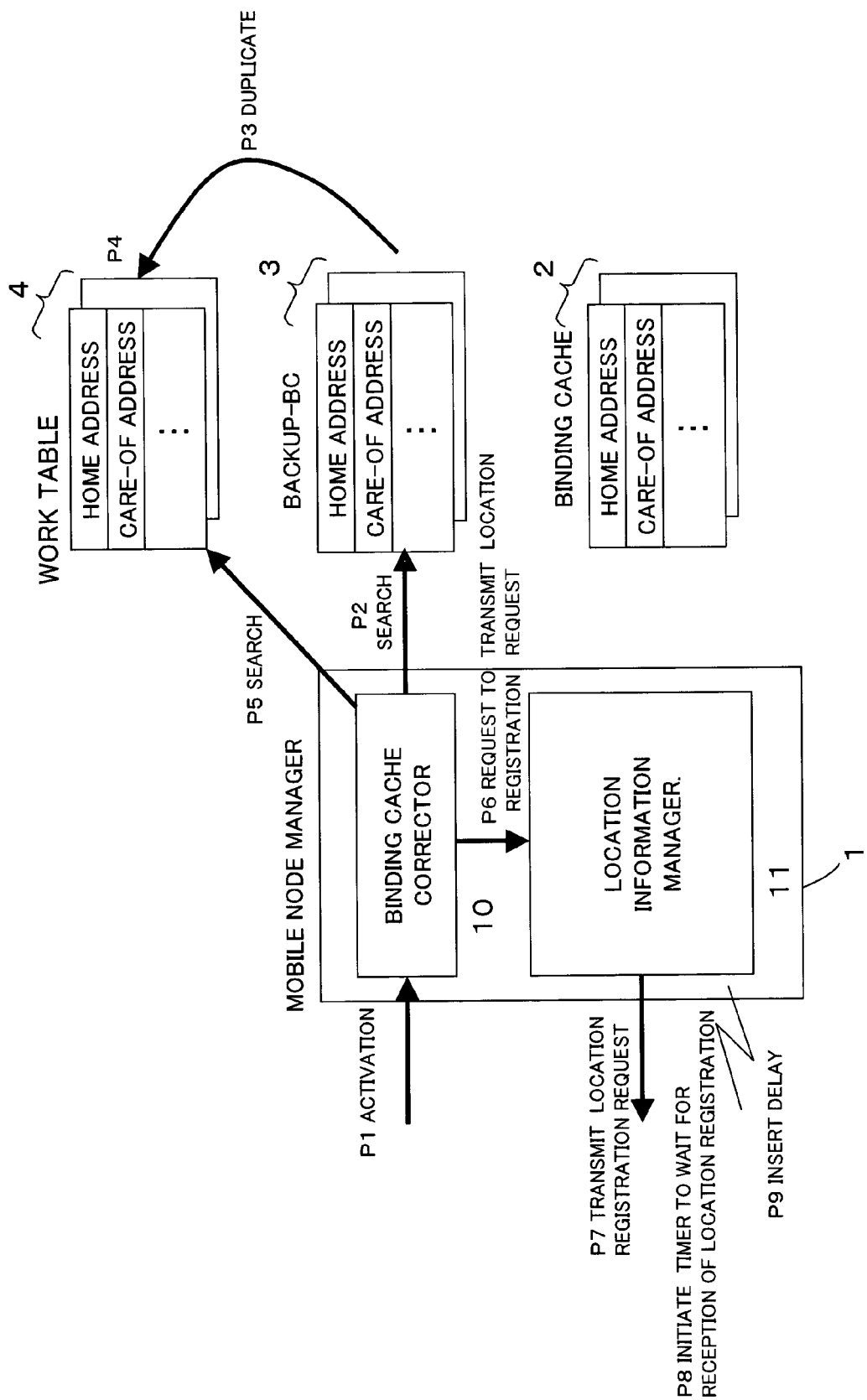
FIG. 13 shows a functional diagram of an exemplary configuration of home agent HA.

FIG. 13 shows a functional diagram of an exemplary configuration of home agent HA. Home agent HA is provided with mobile node manager 1, binding cache 2, backup binding cache 3, and work table 4. Mobile node manager 1 further includes a binding cache corrector 10 and a location information manager 11.

Figure 14:
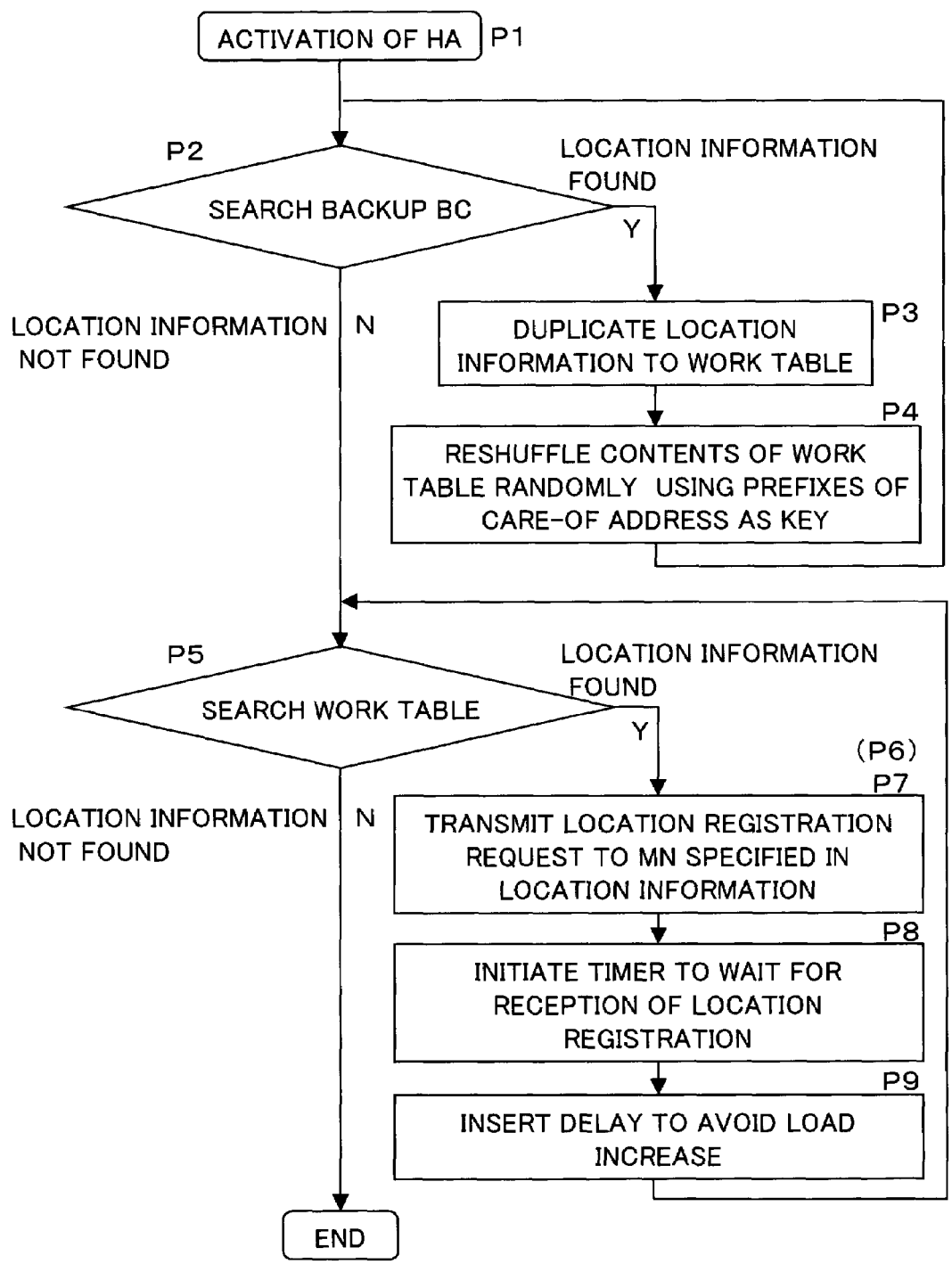
FIG. 14 shows a processing flowchart corresponding to FIG. 13.

Further, FIG. 14 shows a processing flowchart corresponding to FIG. 13. In FIG. 12, it is assumed that a failure occurs in home agent HA (step ①-10). When home agent HA is restored from the failure and restarted (procedure P1), binding cache corrector 10 searches backup binding cache 3 to find out whether location information is stored (procedure P2).

When it is found that location information is stored in backup binding cache (BC) 3 ('Y' in procedure P2), the location information is duplicated into work table 4 (procedure P3). Thereafter, work table 4 is randomly reshuffled with each prefix of the care-of address (CoA) handled as a key (procedure P4).

When the entire location information in backup binding cache (BC) 3 is duplicated and stored into work table 4 through these procedures P2 to P4, table 4 is searched (procedure P5).

A request is issued to location information manager 11 to transmit a request for location registration to mobile node MN corresponding to the location information in work table 4 (procedure P6). Location information manager 11 then transmits a location registration request (procedure P7: step ②-10). At this time, a timer to wait for reception of location registration is initiated (procedure P8).

If a plurality of mobile nodes MN are included in work table 4, transmission intervals of the location registration requests are controlled to produce delay on a mobile node basis, so as to avoid excessive load increase in both the node concerned and the network to which the requests are transmitted (procedure P9).

Figure 15:
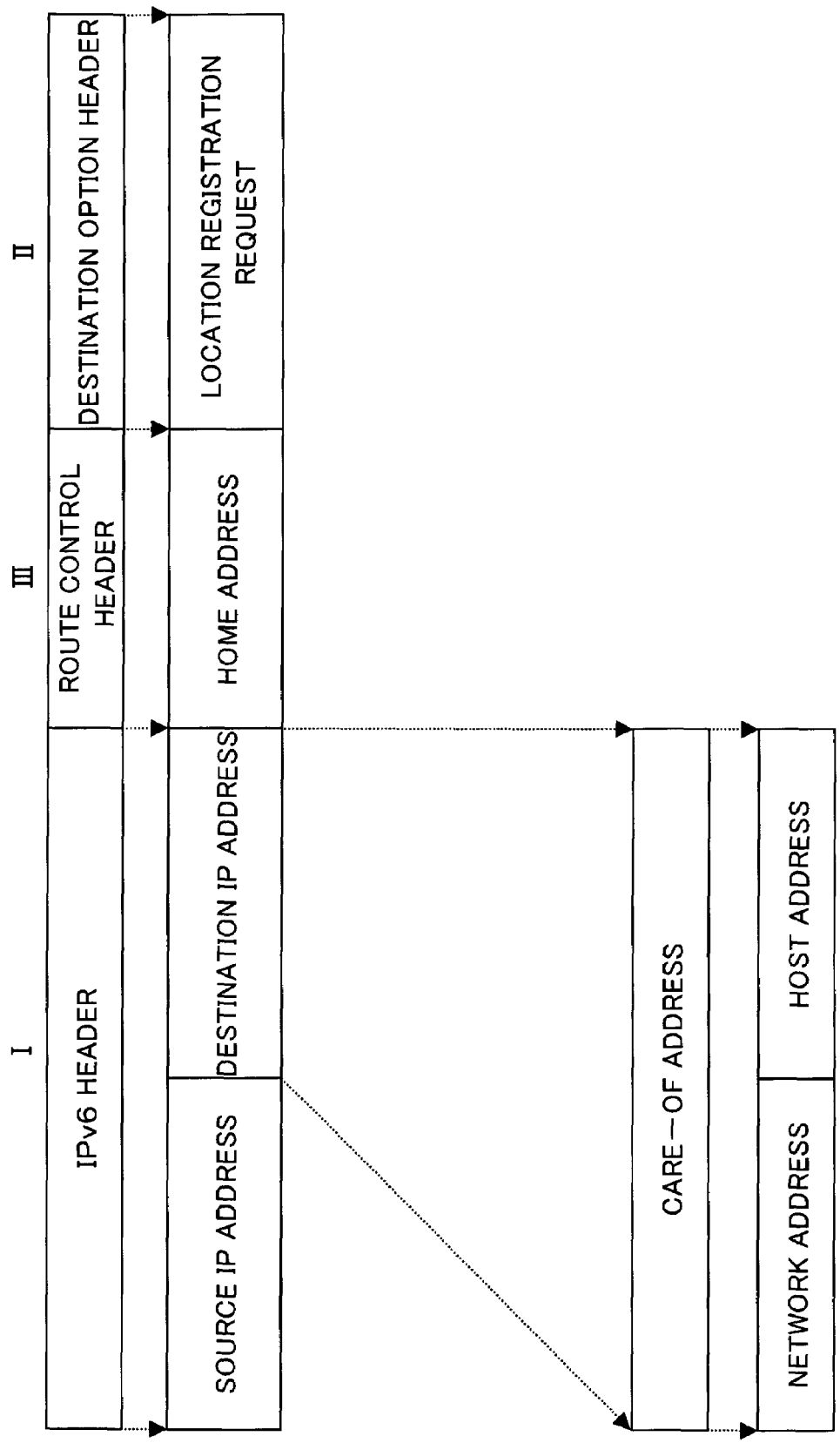
FIG. 15 shows a diagram illustrating a message format of a location registration request.

Here, the location registration request transmitted from home agent HA is performed by the use of an exemplary message format of a location registration request shown in FIG. 15. As compared with the format of the location registration message from mobile node MN shown in FIG. 5, there is added a route control header III. In this case, as mobile node MN is located on the route, the home address (HoA) of mobile node MN is inserted into route control header III.

On receipt of the location registration request from home agent HA, mobile node MN transmits the location registration information to home agent HA (step ③-10).

Figure 16:
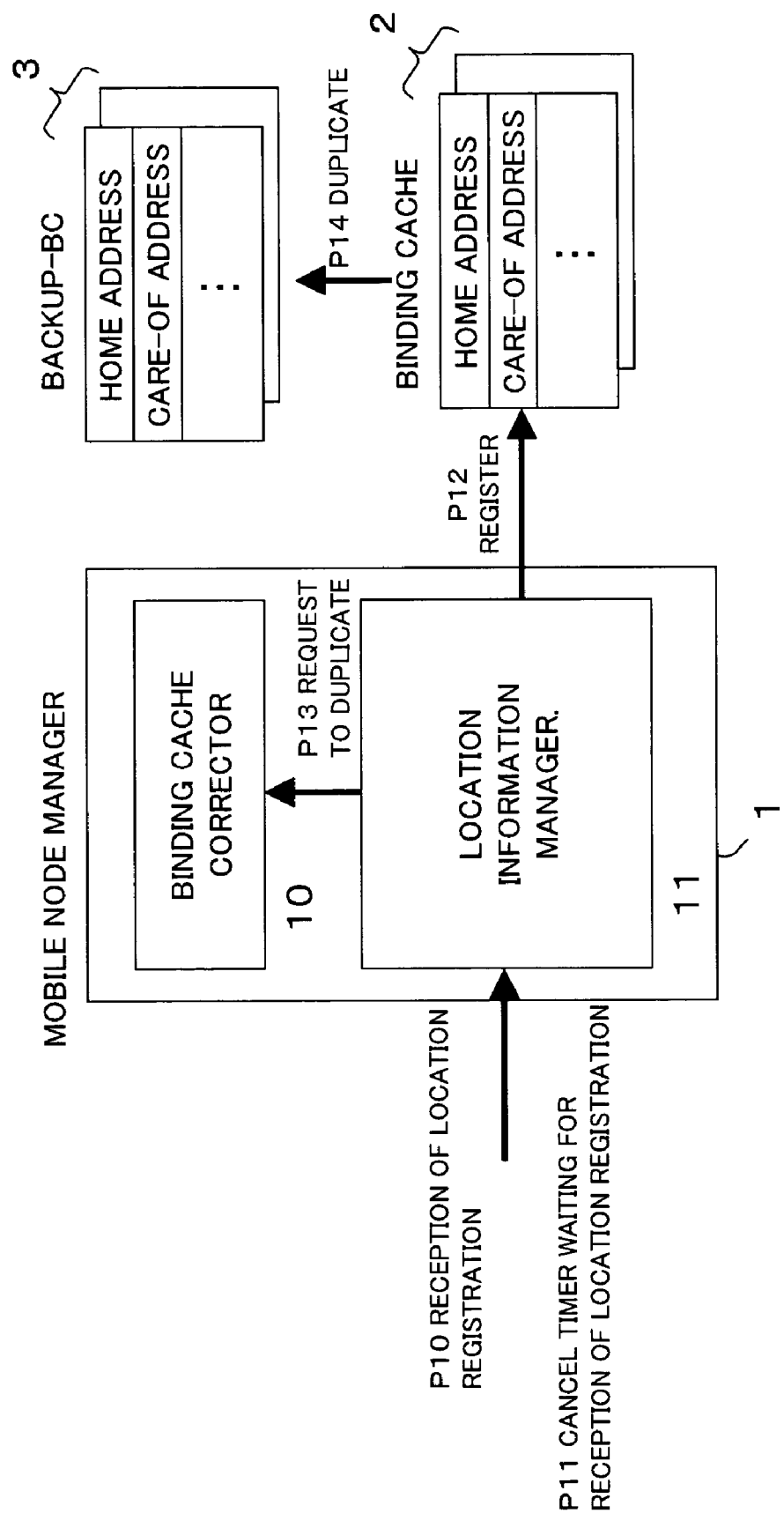
FIG. 16 shows an operation of home agent HA performed when receiving location registration information from mobile node MN in response to a location registration request sent from home agent HA.
Figure 17:
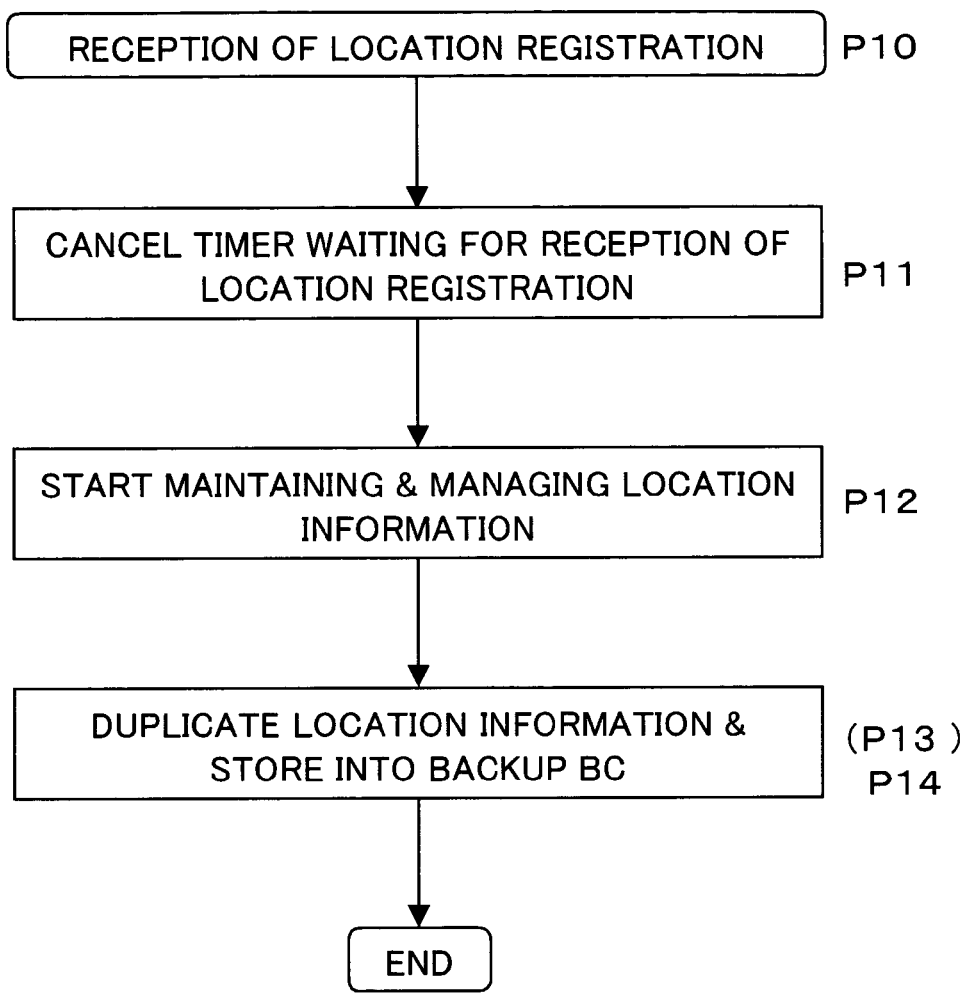
FIG. 17 shows a processing flowchart corresponding to FIG. 16.

FIG. 16 shows an operation of home agent HA when receiving location registration information from mobile node MN in response to a location registration request from home agent HA. Also, FIG. 17 shows a processing flowchart corresponding to FIG. 16.

When home agent HA receives the location registration information from mobile node MN (procedure P10), home agent HA cancels the timer waiting for reception of the location registration (procedure P11). Home agent HA then starts to maintain and manage the location information in location information manager 11 after registering the location information into binding cache (BC) 2 (procedure P12). At this time, location information manager 11 requests binding cache corrector 10 to duplicate binding cache 2 and stores into backup binding cache 3 (procedure P13). Thus binding cache BC is duplicated (procedure P14).

Figure 18:
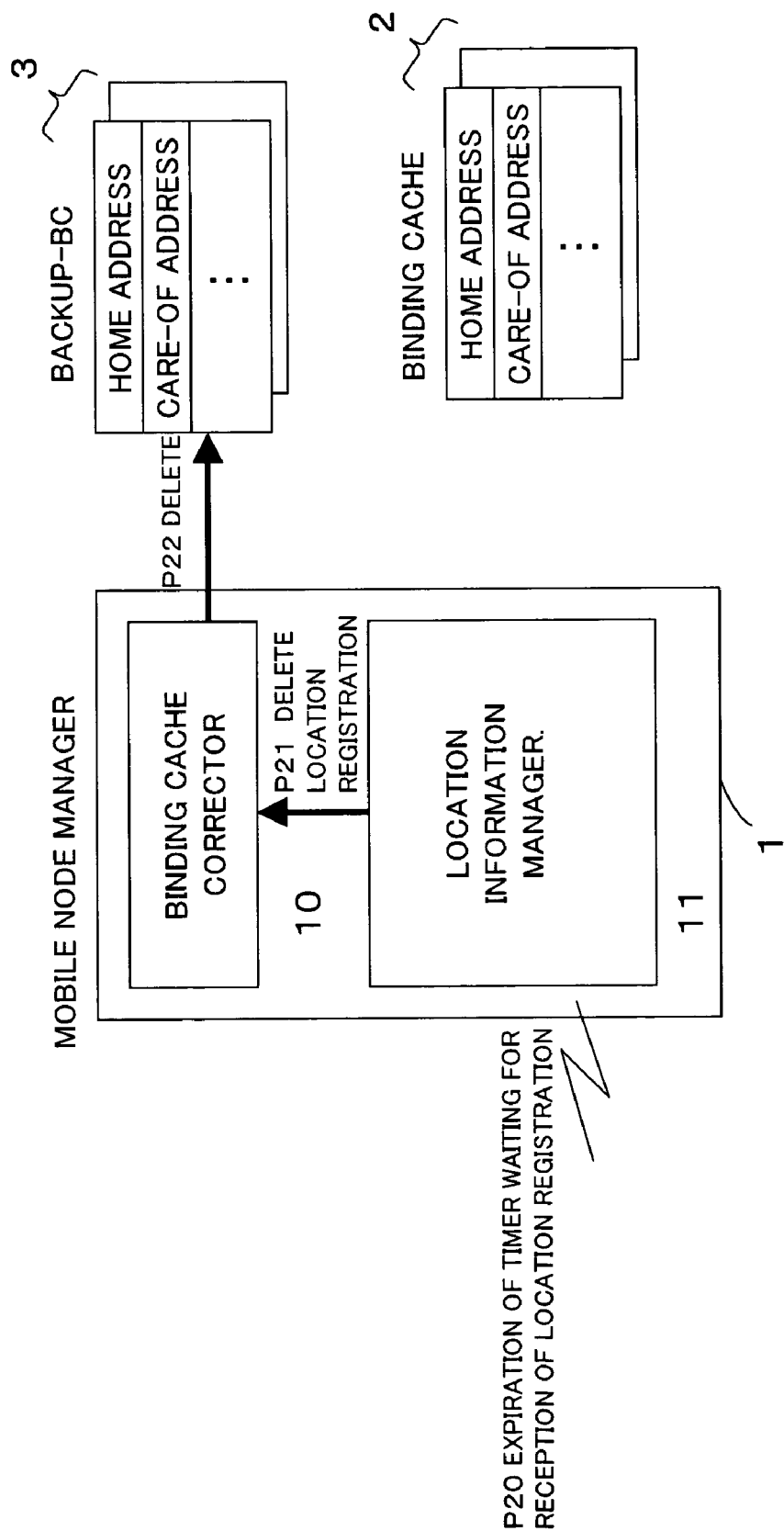
FIG. 18 shows a diagram illustrating a procedure of deleting the location information in backup binding cache BC in the case of Mobile-IPv6.

FIG. 18 shows a procedure of deleting the location information in backup binding cache BC in the case of Mobile-IPv6, when home agent HA is restored from the failure having occurred therein and identifies binding cache BC invalid as a result of investigating the validity of binding cache BC.

This situation of deleting the location information stored in backup binding cache BC occurs, for example, when mobile node MN cannot receive a location registration request from home agent HA because mobile node MN has moved onto another link before home agent HA is restored.

Figure 19:
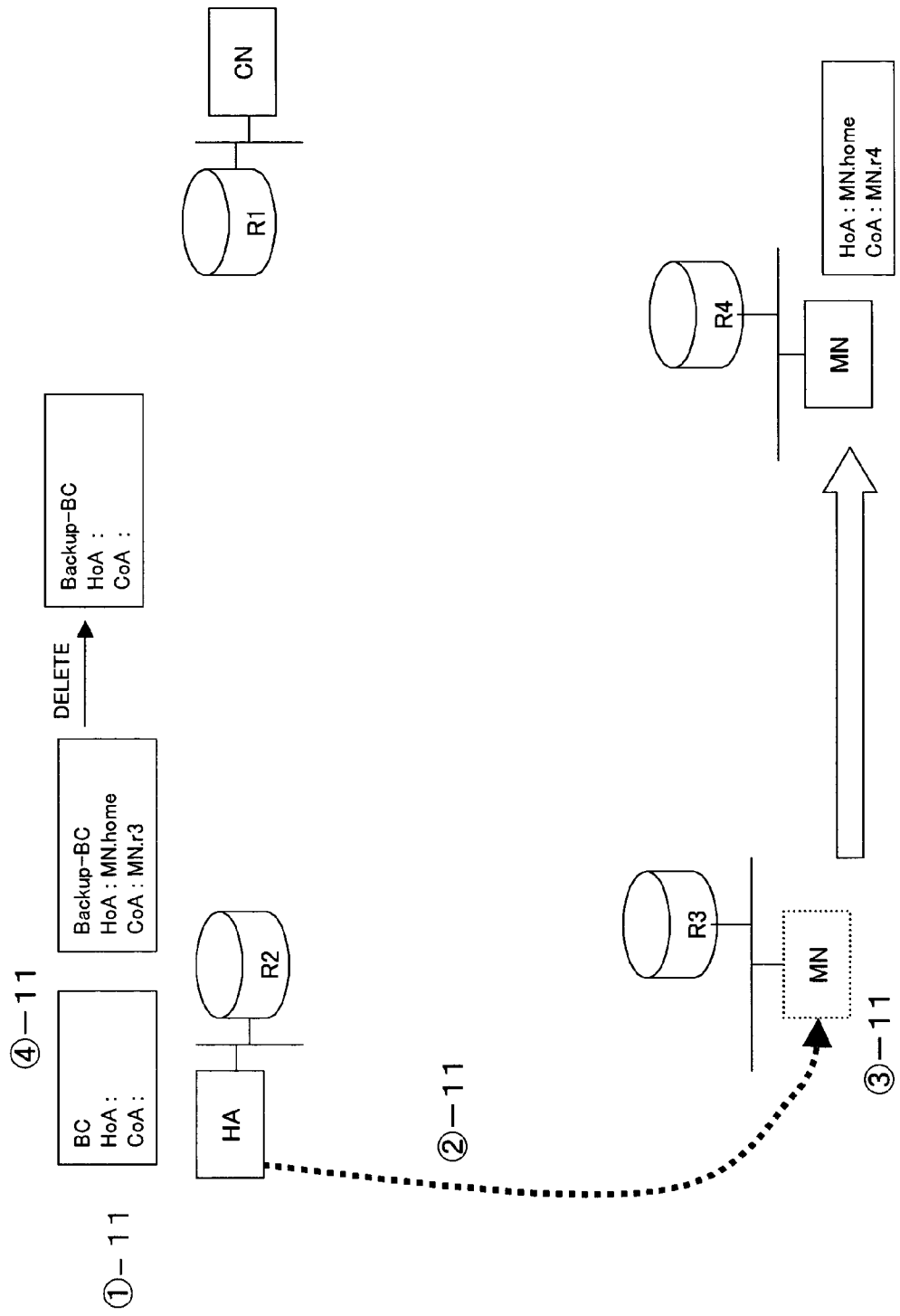
FIG. 19 shows a diagram illustrating a case that a location registration request from home agent HA cannot be received because mobile node MN has moved onto another link before home agent HA is restored.
Figure 20:
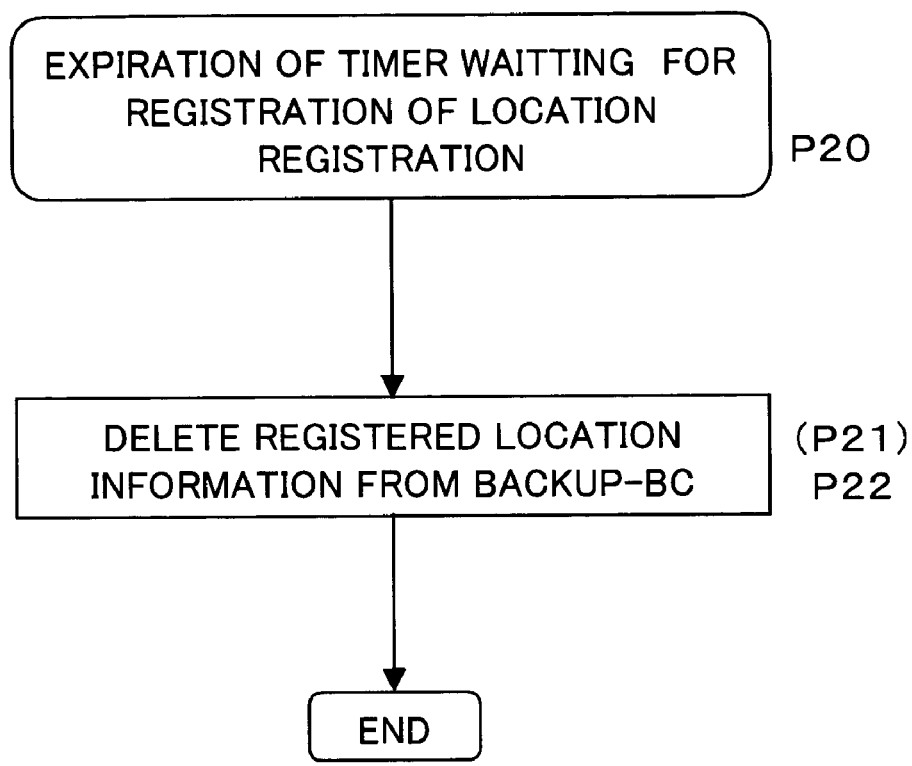
FIG. 20 shows a timing chart corresponding to FIG. 19.

FIG. 19 illustrates the situation mentioned above. FIG. 20 shows a timing chart corresponding to FIG. 19. Namely, when home agent HA is restored from the failure (step ①-11), home agent HA transmits a location registration request to the care-of address of mobile node MN in accordance with binding cache BC having been registered before (step ②-11). When mobile node MN has already moved to another link area (step ③-11), mobile node MN cannot receive this location registration request. This produces expiration of the timer waiting for the location registration reception in location information manager 11 (procedure P20). Location information manager 11 then requests binding cache corrector 10 to delete the registered location information (procedure P21). As a result, backup binding cache 3 is deleted (procedure P22).

Figure 21:
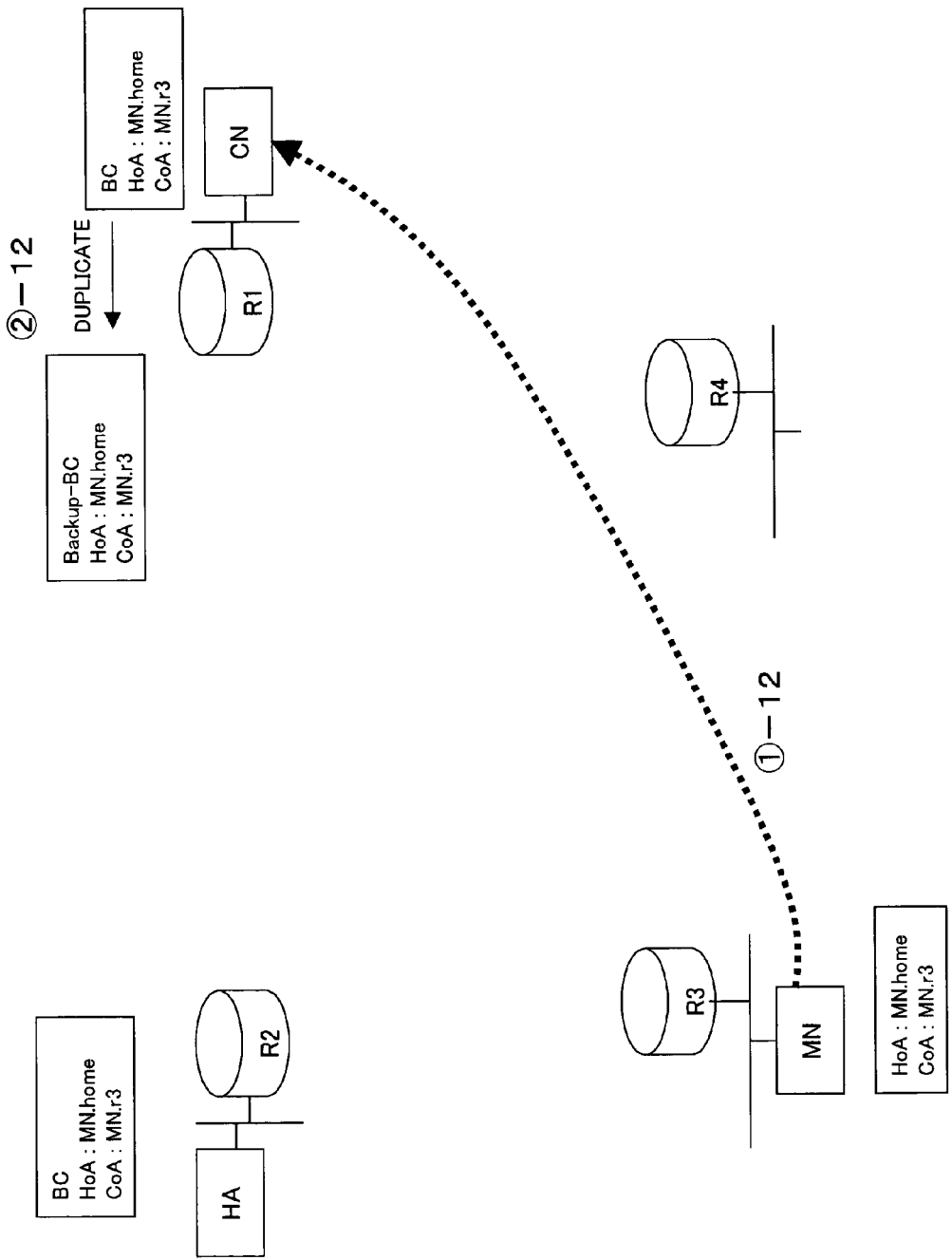
FIG. 21 shows a diagram (part 1) illustrating an exemplary recovery operation of binding cache BC performed in correspondent node CN in the case of Mobile-IPv6.
Figure 22:
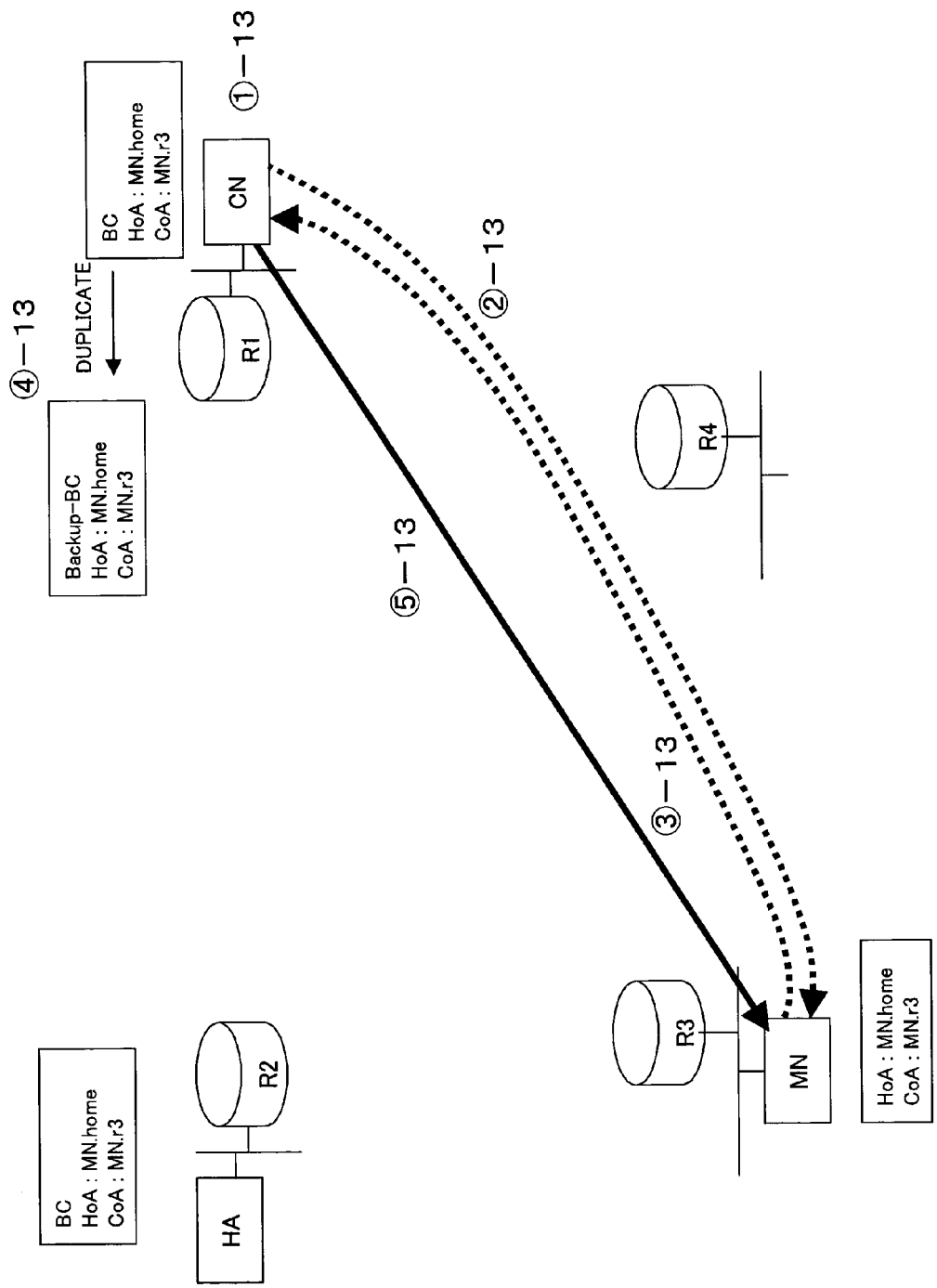
FIG. 22 shows a diagram (part 2) illustrating the exemplary recovery operation of binding cache BC performed in correspondent node CN in the case of Mobile-IPv6.
Figure 23:
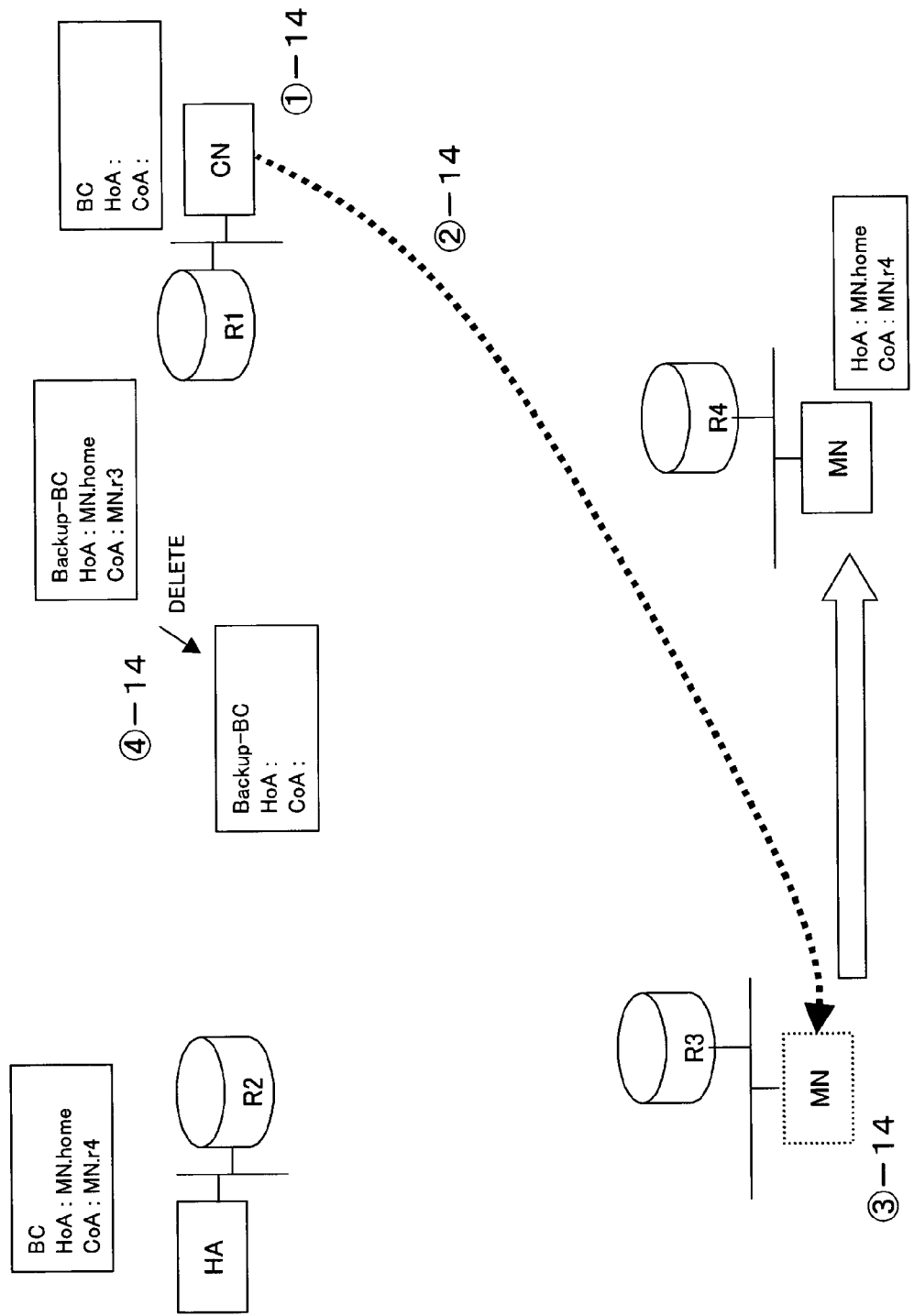
FIG. 23 shows a diagram (part 3) illustrating the exemplary recovery operation of binding cache BC performed in correspondent node CN in the case of Mobile-IPv6.

FIGS. 21 through 23 show diagrams illustrating an exemplary recovery operation of binding cache BC performed in correspondent node CN in the case of Mobile-IPv6. Actual operation flow is similar to the aforementioned case of performing location registration into home agent HA. Therefore, only the outline of the flow will be described below.

In FIG. 21, when mobile node MN moves, mobile node MN obtains the care-of address (CoA) on an external link by the use of a 'Router Advertisement' message which is periodically issued by router R3. Mobile node MN then transmits location registration information to correspondent node CN using the format shown in FIG. 5 (step ①-12).

On receipt of the location registration information from mobile node MN, correspondent node CN manages the location information as binding cache BC. At this time, correspondent node CN duplicates binding cache BC for backup purpose (step ②-12).

Referring to FIG. 22, a failure is assumed to have occurred in correspondent node CN. When correspondent node CN is restored from the failure and is restarted (step ①-13), a location registration request is transmitted from correspondent node CN (step ②-13). At this time, a timer to wait for reception of the location registration is initiated.

Here, the location registration request transmitted from correspondent node CN is performed by the use of an exemplary message format for a location registration request shown in FIG. 15. On receipt of the location registration request from correspondent node CN, mobile node MN transmits the location registration information to correspondent node CN (step ③-13) On receipt of the location information from mobile node MN, correspondent node CN cancels the timer waiting for reception of the location registration, and starts to maintain and manage the location information in location information manager 11 by registering the location information in binding cache (BC) 2. At this time, correspondent node CN duplicates binding cache BC and stores into the backup binding cache (step ④-13).

Thus, correspondent node CN can transmit a packet directly to mobile node MN using the backup binding cache without interception by home agent HA (step ⑤-13).

FIG. 23 shows a process when correspondent node CN is restored from the failure having occurred therein and starts to maintain and manage binding cache BC, using the duplication of binding cache BC shown in FIG. 21, after identifying the validity of the binding cache BC. In particular, the figure shows a case in which the location registration request from correspondent node CN is unable to receive, because mobile node MN has moved onto another link before correspondent node CN is restored.

In FIG. 23, when correspondent node CN is restored (step ①-14), correspondent node CN transmits a location registration request to the care-of address of mobile node MN in accordance with binding cache BC having been registered before (step ②-14). When mobile node MN has already moved to another link area (step ③-14), mobile node MN cannot receive the location registration request. This produces expiration of the timer waiting for the location registration reception in location information manager 11. As a result, backup binding cache 3 is deleted (step ④-14).

Figure 24:
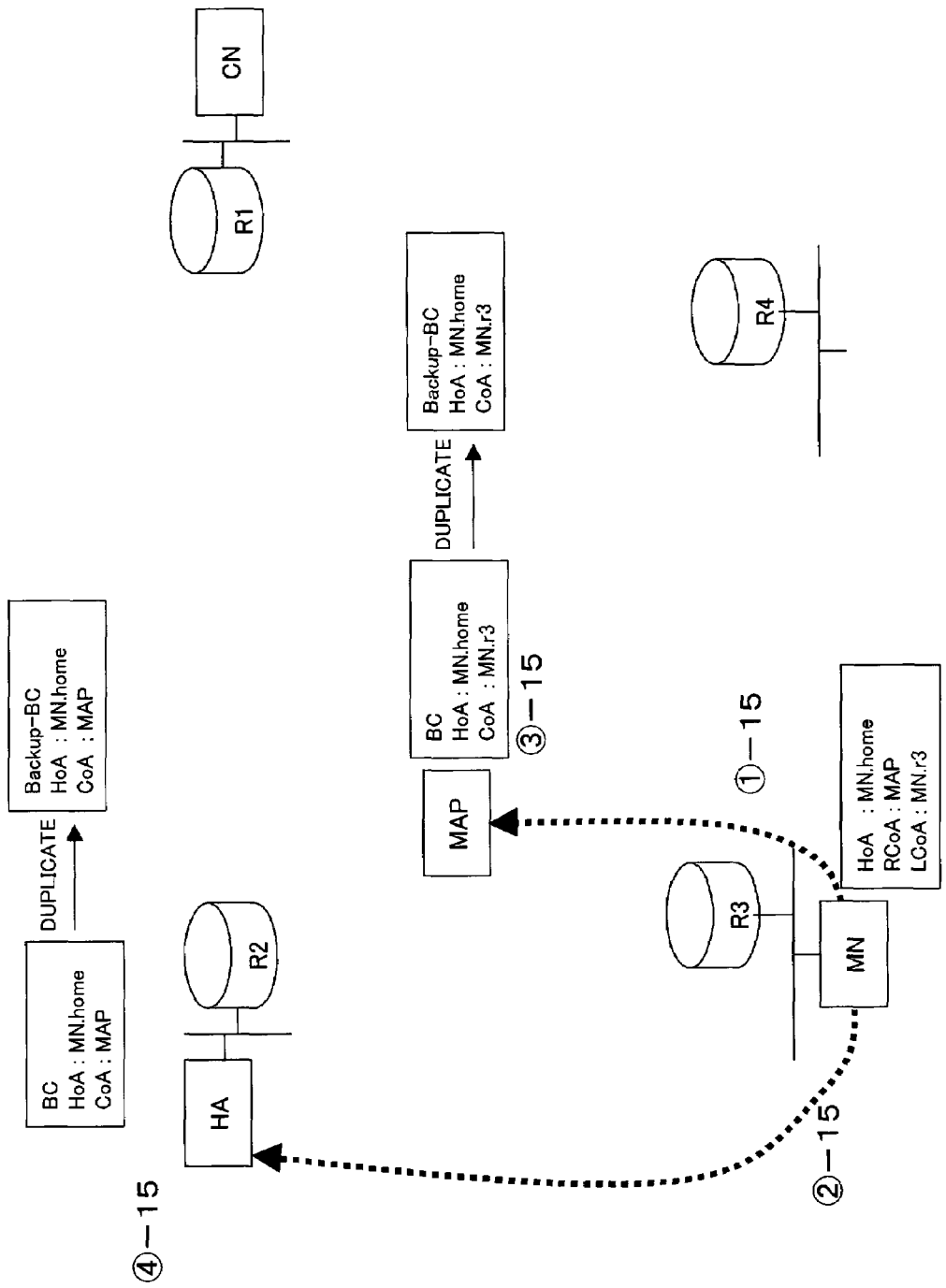
FIG. 24 shows a diagram (part 1) illustrating an exemplary recovery operation of binding cache BC performed in mobility anchor point MAP in the case of Hierarchical Mobile-IPv6.
Figure 25:
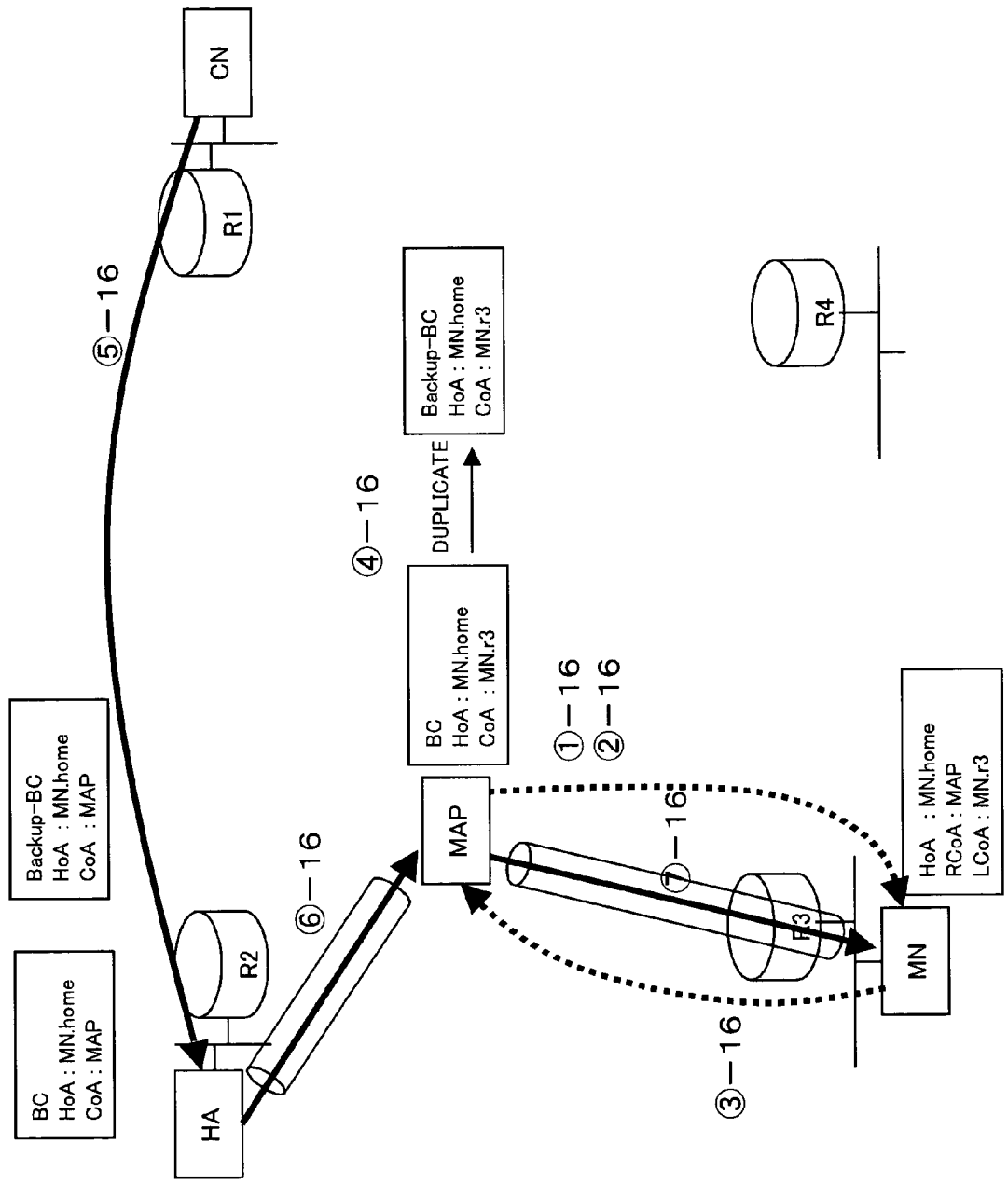
FIG. 25 shows a diagram (part 2) illustrating an exemplary recovery operation of binding cache BC performed in mobility anchor point MAP in the case of Hierarchical Mobile-IPv6.
Figure 26:
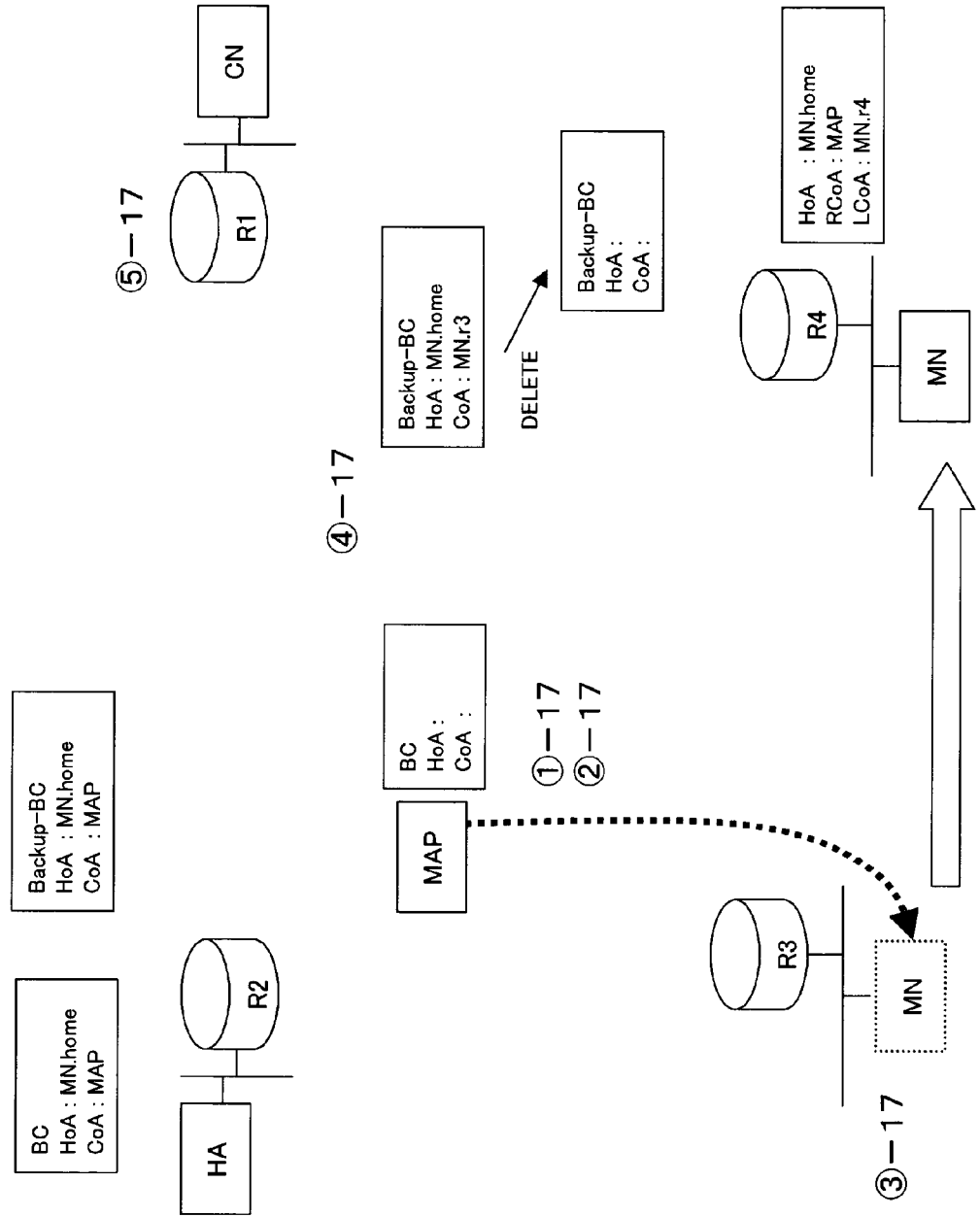
FIG. 26 shows a diagram (part 3) illustrating an exemplary recovery operation of binding cache BC performed in mobility anchor point MAP in the case of Hierarchical Mobile-IPv6.

FIGS. 24 through 26 show diagrams illustrating an exemplary recovery operation of binding cache BC performed in mobility anchor point MAP in the case of Hierarchical Mobile-IPv6. Actual operation flow is similar to the aforementioned case of performing location registration into home agent HA. Therefore, only the outline of the flow will be described below.

In FIG. 24, when mobile node MN moves, mobile node MN obtains the care-of address (CoA) on an external link by the use of a 'Router Advertisement' message which is periodically issued by router R3. Mobile node MN then transmits location registration information to mobility anchor point MAP using the format shown in FIG. 5 (step ①-15).

At the same time, mobile node MN also transmits the location registration information to home agent HA (step ②-15).

When mobility anchor point MAP receives the location registration information from mobile node MN, mobility anchor point MAP manages the location information as binding cache BC. At this time, mobility anchor point MAP duplicates binding cache BC for backup purpose (step ③-15).

Similarly, in home agent HA, binding cache BC is duplicated when the location registration information is received from mobile node MN (step ④-15).

Referring to FIG. 25, a failure is assumed to have occurred in mobility anchor point MAP. When mobility anchor point MAP is restored from the failure and is restarted (step ①-16), a location registration request is transmitted from mobility anchor point MAP (step ②-16). At this time, a timer to wait for reception of the location registration is initiated.

Here, the location registration request transmitted from mobility anchor point MAP is also performed by the use of an exemplary message format for a location registration request shown in FIG. 15. On receipt of the location registration request from mobility anchor point MAP, mobile node MN transmits the location registration information to mobility anchor point MAP (step ③-16).

On receipt of the location information from mobile node MN, mobility anchor point MAP cancels the timer waiting for reception of the location registration. Mobility anchor point MAP then starts to maintain and manage the location information in location information manager 11 after the location information is registered in binding cache (BC) 2. At this time, mobility anchor point MAP duplicates binding cache BC for backup purpose (step ④-16).

When correspondent node CN intends to transmit a packet to mobile node MN, correspondent node CN transmits the packet to the home address (HoA) of mobile node MN (step ⑤-16). Home agent HA then transfers the packet to the address of mobility anchor point MAP in accordance with binding cache BC (step ⑥-16). Thereafter, it is possible for mobility anchor point MAP to transmit the packet to mobile node MN by the use of backup binding cache (step ⑦-16).

FIG. 26 shows a process when mobility anchor point MAP is restored from the failure which has occurred therein. Mobility anchor point MAP starts to maintain and manage binding cache BC using the duplication of binding cache BC shown in FIG. 25, after the validity of binding cache BC is identified.

In particular, this case shows that mobile node MN cannot receive the location registration request from mobility anchor point MAP, because mobile node MN has moved onto another link before mobility anchor point MAP is restored.

In FIG. 26, when mobility anchor point MAP is restored (step ①-17), mobility anchor point MAP transmits a location registration request to the care-of address of mobile node MN in accordance with binding cache BC having been registered before (step ②-17). When mobile node MN has already moved to another link area (step ③-17), mobile node MN cannot receive the location registration request. This produces expiration of the timer waiting for the location registration reception in location information manager 11. Accordingly, backup binding cache 3 is deleted (step ④-17).

As can be understood from the above description, according to the present invention, when a failure occurs in a node managing the location information of mobile node MN, it is possible to resume packet transfer from correspondent node CN to mobile node MN after the node is restored from the failure. Moreover, there is no need of waiting for the location re-registration which is to be initiated by mobile node MN. Accordingly, it becomes possible to reduce packet transfer loss from one mobile node MN to another.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A mobile communication network system comprising a plurality of nodes including a home agent, a correspondent node, and a mobility anchor point connected to the network,
    wherein each node produces a duplication of a binding cache on receipt of location registration information from a mobile terminal, maintains and manages the duplication of the binding cache for backup purposes, and on restoration of the node from a failure, each node obtains the contents of the binding cache as generated and stored before the node failure from the duplicated binding cache,
    wherein the node transmits a location registration request to the mobile terminal in accordance with the contents of the binding cache obtained as generated before the node failure, and when no response is received against the location registration request, the node determines the obtained binding cache as invalid, and deletes the location information of said mobile terminal.

2. The mobile communication network system according to claim 1,
    wherein, when a plurality of mobile terminals exist as objects for transmitting the location registration request, the node controls transmission intervals of said location registration requests to the plurality of mobile terminals by successively transmitting with delay.

3. A mobile communication network system comprising a plurality of nodes each connected to the network,
    wherein, when a mobile terminal moves from a particular node to another different node, said mobile terminal obtains from an external link a node address after the movement as a care-of address, and transmits the obtained care-of address to the particular node as location registration information,
    the particular node registers the location registration information into a binding cache, manages the location registration information, duplicates the contents of the binding cache for backup purpose, and maintains and manages the duplicated contents of the binding cache, and
    when the particular node is restored from a failure and initiated for restoration, the particular node transmits a location registration request to the mobile terminal which is registered in the duplicated contents of the binding cache, and when no response is received from the mobile terminal against the location registration request, the node deletes the location information of the mobile terminal from the binding cache.

4. The mobile communication network system according to claim 3,
    wherein the plurality of nodes include a correspondent node and a home agent, and
    when the correspondent node transmits a packet to the mobile terminal using a home address of the mobile terminal, the home agent transfers the packet to the care-of address registered in the binding cache.

5. The mobile communication network system according to claim 4, farther comprising a mobility anchor point as one of the plurality of nodes,
    wherein the mobile terminal transmits the care-of address, which is transmitted to the home agent as location registration information, to the mobility anchor point as location registration information, and registers the care-of address into a binding cache of the mobility anchor point.

6. The mobile communication network system according to claim 5,
    wherein, when a packet is transmitted from the correspondent node to the mobile terminal using the home address of the mobile terminal, the packet is intercepted by the home agent and the mobility anchor point, and transferred to the mobile terminal.

* * * * *